United States Patent
Choi et al.

(10) Patent No.: US 10,432,443 B2
(45) Date of Patent: Oct. 1, 2019

(54) APPARATUS AND METHOD FOR SIGNAL MODULATION AND DEMODULATION IN FILTER BANK MULTI-CARRIER SYSTEM

(71) Applicant: RESEARCH COOPERATION FOUNDATION OF YEUNGNAM UNIVERSITY, Gyeongsangbuk-do (KR)

(72) Inventors: Kwonhue Choi, Gyeongsangbuk-do (KR); Dongjun Na, Gyeongsangbuk-do (KR)

(73) Assignee: RESEARCH COOPERATION FOUNDATION OF YEUNGNAM UNIVERSITY, Gyeongsangbuk-do (KR)

( * ) Notice: Subject to any disclaimer, the term of this patent is extended or adjusted under 35 U.S.C. 154(b) by 0 days.

(21) Appl. No.: 15/897,301

(22) Filed: Feb. 15, 2018

(65) Prior Publication Data
US 2018/0254936 A1   Sep. 6, 2018

(30) Foreign Application Priority Data

Mar. 2, 2017   (KR) .................. 10-2017-0027341

(51) Int. Cl.
*H04L 27/26*   (2006.01)
*H04L 27/34*   (2006.01)
*H04L 27/36*   (2006.01)

(52) U.S. Cl.
CPC ........ *H04L 27/264* (2013.01); *H04L 27/2614* (2013.01); *H04L 27/3411* (2013.01); *H04L 27/362* (2013.01); *H04L 27/2636* (2013.01); *H04L 27/2698* (2013.01)

(58) Field of Classification Search
CPC ............... H04L 27/264; H04L 27/2636; H04L 27/2698; H04L 27/2631; H04L 27/3411
USPC ......................................... 375/260, 295–298
See application file for complete search history.

(56) References Cited

U.S. PATENT DOCUMENTS

| | | | | |
|---|---|---|---|---|
| 2007/0115800 A1* | 5/2007 | Fonseka | ................ | H04L 1/0054 370/208 |
| 2008/0075191 A1* | 3/2008 | Haartsen | ............. | H04L 27/2614 375/285 |
| 2012/0177145 A1* | 7/2012 | Han | ........................ | H04J 13/10 375/308 |
| 2014/0169501 A1* | 6/2014 | Nazarathy | .......... | H03H 17/0266 375/316 |
| 2014/0192925 A1* | 7/2014 | Li | ........................... | H04L 25/08 375/297 |
| 2015/0092885 A1* | 4/2015 | Li | ....................... | H04L 27/2631 375/296 |
| 2016/0182270 A1* | 6/2016 | Jungnickel | ........ | H04L 25/03828 375/260 |
| 2017/0134203 A1* | 5/2017 | Zhu | ...................... | H04B 7/0456 |

(Continued)

*Primary Examiner* — Emmanuel Bayard
(74) *Attorney, Agent, or Firm* — The PL Law Group, PLLC

(57) ABSTRACT

A plurality of candidate transmission signals which are modulated according to a discrete Fourier transform (DFT)-spread filter-bank multi-carrier (FBMC)/offset quadrature amplitude modulation (OQAM) scheme and are capable of achieving a single carrier effect are generated. A candidate transmission signal having the smallest peak to average power ratio (PAPR) is selected and transmitted, so that a PAPR performance can be effectively improved.

18 Claims, 11 Drawing Sheets

(56) References Cited

U.S. PATENT DOCUMENTS

2017/0264424 A1* 9/2017 Cassiau ................ H04L 7/0033
2018/0212813 A1* 7/2018 Kim ....................... H04L 27/26

* cited by examiner

APPARATUS AND METHOD FOR SIGNAL MODULATION AND DEMODULATION IN FILTER BANK MULTI-CARRIER SYSTEM

CROSS-REFERENCE TO RELATED APPLICATION(S)

This application claims the benefit under 35 USC § 119(a) of Korean Patent Application No. 10-2017-0027341, filed on Mar. 2, 2017, in the Korean Intellectual Property Office, the entire disclosure of which is incorporated herein by reference for all purposes.

BACKGROUND

1. Field

The following description relates to a transmission/reception technology using a filter-bank multi-carrier scheme, and more specifically, to the filter bank multi-carrier (FBMC)/offset quadrature amplitude modulation (OQAM) technology using discrete Fourier transform (DFT)-spreading.

2. Description of Related Art

As a modulation technique for the fifth generation (5G) mobile communication, a filter bank multi-carrier (FBMC) modulation technique using a plurality of subcarriers is attracting increasing attention. However, the FBMC modulation technique has a high peak to average power ratio (PAPR) characteristic due to overlapping of a plurality of subcarrier signals.

In particular, the FBMC/OQAM (offset quadrature amplitude modulation) technique cannot achieve a single carrier effect due to the structural problems of OQAM even when discrete Fourier transform (DFT) spreading is applied as in single carrier-frequency division multi access (SC-FDMA).

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Exemplary embodiments of the present disclosure are intended to provide an apparatus and method for reducing a peak to average power ratio (PAPR) in a filter-band multi-carrier system.

According to one exemplary embodiment of the present disclosure, there is provided a modulation apparatus including: a discrete Fourier transform (DFT) performer configured to generate DFT-spread data symbols by performing DFT on parallel input data symbols; a modulator configured to divide the DFT-spread data symbols into real part symbols and imaginary part symbols, multiply each of the divided symbols by a phase shift coefficient, and modulate the multiplied symbols using a filter-bank multi-carrier (FBMC)/offset quadrature amplitude modulation (OQAM) scheme, thereby generating a plurality of different candidate transmission signals each of which is composed of identically time-shifted subcarriers; and a selector configured to select a candidate transmission signal having the smallest peak power or the smallest peak to average power ratio (PAPR) from the plurality of candidate transmission signals as a transmission signal.

According to another exemplary embodiment of the present disclosure, there is provided a modulation method including operations of: a) generating discrete Fourier transform (DFT)-spread data symbols by performing DFT on parallel input data symbols; b) dividing the DFT-spread data symbols into real part symbols and imaginary part symbols, multiplying each of the divided symbols by a phase shift coefficient, modulating the multiplied symbols using a filter-bank multi-carrier (FBMC)/offset quadrature amplitude modulation (OQAM) scheme, thereby generating a plurality of different candidate transmission signals each of which is composed of identically time-shifted subcarriers; and c) selecting a candidate transmission signal having the smallest peak power or the smallest peak to average power ratio (PAPR) from the plurality of candidate transmission signals as a transmission signal.

Other features and aspects will be apparent from the following detailed description, the drawings, and the claims.

Figure 1:
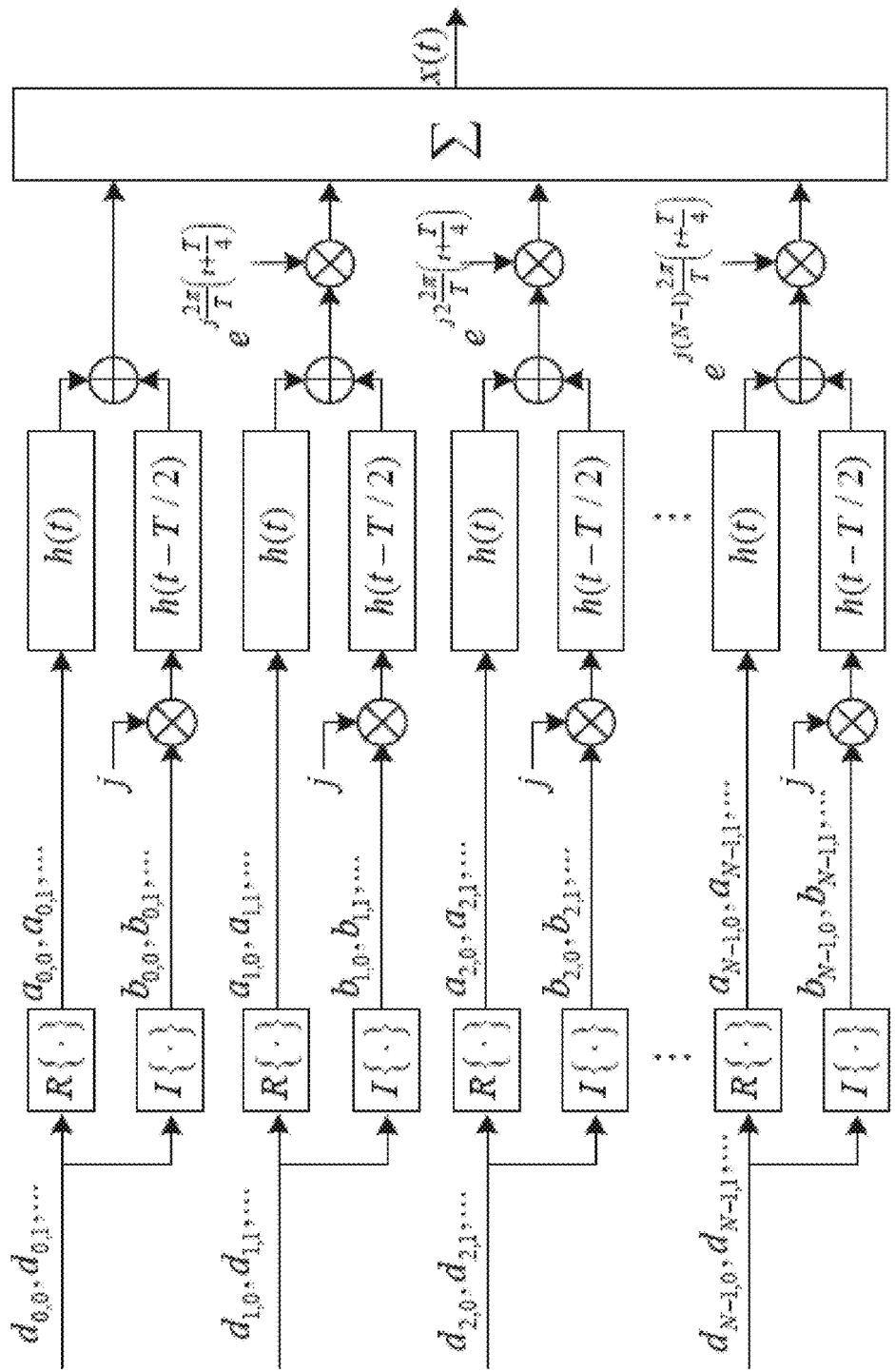
FIG. 1 is a diagram illustrating a mathematical structure of a transmitter using a filter-bank multi-carrier/offset quadrature amplitude modulation (FBMC/OQAM) scheme.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art.

Descriptions of well-known functions and constructions may be omitted for increased clarity and conciseness. Also, terms described in below are selected by considering functions in the embodiment and meanings may vary depending on, for example, a user or operator's intentions or customs. Therefore, definitions of the terms should be made on the basis of the overall context. The terminology used in the detailed description is provided only to describe embodiments of the present disclosure and not for purposes of limitation. Unless the context clearly indicates otherwise, the singular forms include the plural forms. It should be understood that the terms "comprises" or "includes" specify some features, numbers, steps, operations, elements, and/or combinations thereof when used herein, but do not preclude the presence or possibility of one or more other features, numbers, steps, operations, elements, and/or combinations thereof in addition to the description.

FIG. 1 is a diagram illustrating a mathematical structure of a transmitter using a filter-bank multi-carrier/offset quadrature amplitude modulation (FBMC/OQAM) scheme.

In a FBMC/OQAM scheme, an $m^{th}$ data symbol transmitted by an $n^{th}$ subcarrier may be expressed by Equation 1 below.

$$d_{n,m} = a_{n,m} + jb_{n,m}, 0 \leq n \leq N-1, 0 \leq m \leq M-1 \quad (1)$$

Here, n denotes an index of a subcarrier, m denotes an index of a data symbol, $a_{n,m}$ and $b_{n,m}$ denote, respectively, a real part symbol and an imaginary part symbol of the $m^{th}$ data symbol to be transmitted by the $n^{th}$ subcarrier, N denotes the number of subcarriers allocated to each user, and M denotes a length of a data frame to be transmitted. Hereafter, $a_{n,m}$, $b_{n,m}$, m, n, N, and M will be interpreted as described above.

Referring to FIG. 1, data symbols $d_{n,m}$ to be transmitted by the $n^{th}$ subcarrier are divided into real part symbols $a_{n,m}$ and imaginary part symbols $b_{n,m}$. Then, the real part symbols $a_{n,m}$ are input to a prototype filter having impulse response h(t) intact and the imaginary part symbols $b_{n,m}$ are multiplied by an imaginary number j and then input to a prototype filter h(t−T/2) delayed by T/2 on a time axis. Here, T denotes a symbol duration of $d_{n,m}$, and an impulse response length of the prototype filter is determined by an overlap coefficient K of the filter. Hereinafter, T and K will be interpreted as described above.

Then, outputs of h(t) and h(t−T/2) for the real part symbols and the imaginary part symbols $b_{n,m}$ are summed up and then multiplied by a subcarrier $$e^{jn\frac{2\pi}{T}(t+\frac{T}{4})}$$

shifted by T/4.

Then, a transmission signal x(t) is generated by adding all signals multiplied by the subcarrier.

Thus, the generated transmission signal x(t) may be expressed as Equation 2 below.

$$x(t) = \sum_{n=0}^{N-1} \sum_{m=0}^{M-1} \left\{ a_{n,m}h(t-mT) + jb_{n,m}h\left(t-mT-\frac{T}{2}\right) \right\} e^{jn\frac{2\pi}{T}(t+\frac{T}{4})} \quad (2)$$

Meanwhile, in the case of the conventional FBMC/OQAM technique shown in FIG. 1, the transmission signal x (t) has a high peak to average power ratio (PAPR) characteristic due to superposition of subcarriers. In addition, when the transmission signal having a high PAPR passes through a nonlinear amplifier of the transmitter, constellation of the data symbol may be distorted, which may cause performance degradation of the overall system, and the magnitude of an out of band (OOB) power may be increased due to the nonlinear amplification component. Thus, the advantage of FBMC to reduce the OOB power by individual filtering of the subcarriers is lost.

Figure 2:
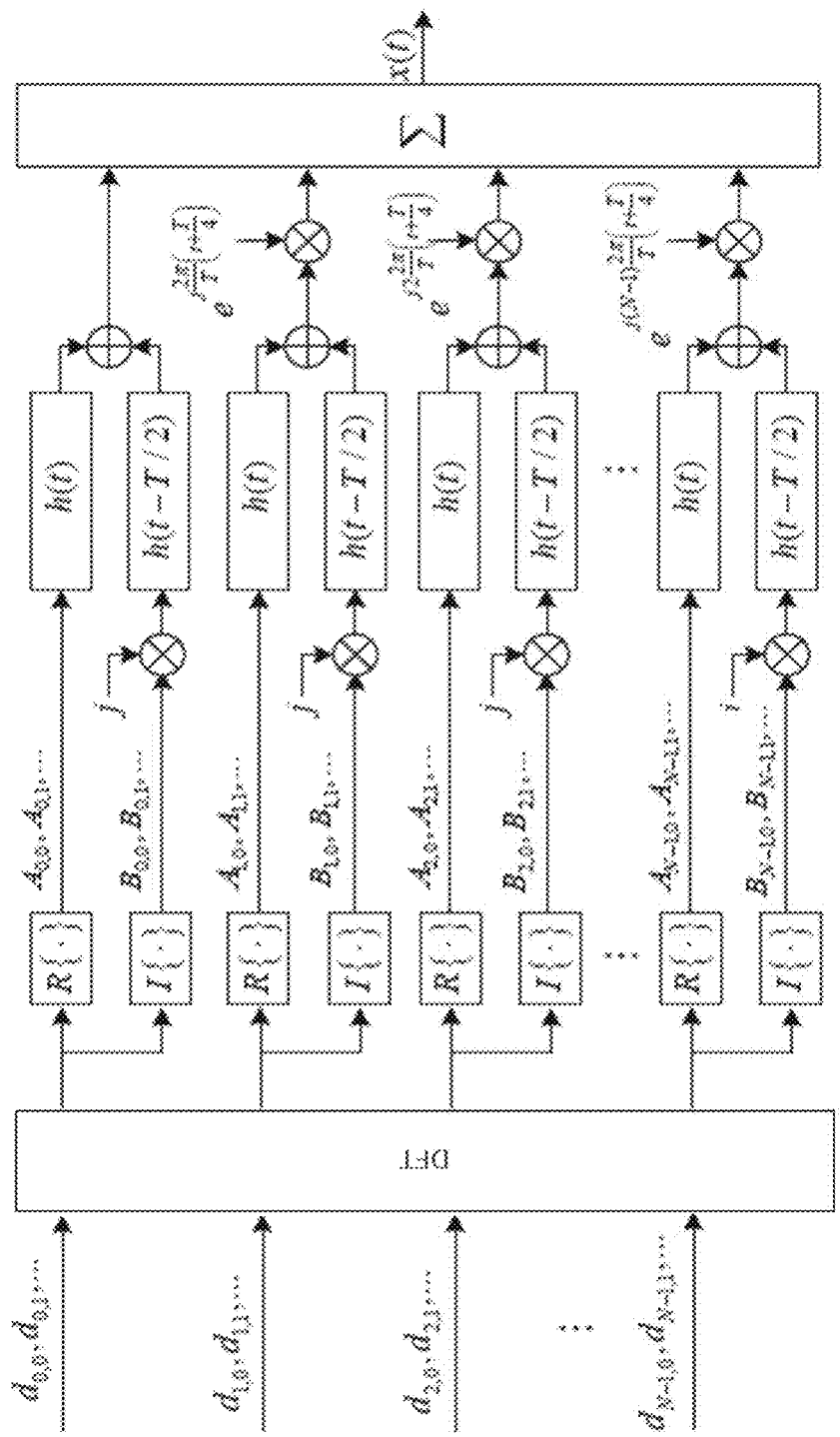
FIG. 2 is a diagram illustrating a mathematical structure of a transmitter which uses a discrete Fourier transform (DFT)-spread FBMC/OQAM scheme.

FIG. 2 is a diagram illustrating a mathematical structure of a transmitter which uses a discrete Fourier transform (DFT)-spread FBMC/OQAM scheme.

Referring to FIG. 2, in order to reduce a PAPR, the DFT spread FBMC/OQAM scheme is preceded by a DFT spreading process for the parallel data symbols $d_{n,m}$ in the structure shown in FIG. 1.

When DFT spreading is performed on the data symbols $d_{n,m}$, the spread data symbols $D_{n,m}$ may be expressed by Equation 3 below.

$$D_{n,m} = A_{n,m} + jB_{n,m}, 0 \leq n \leq N-1, 0 \leq m \leq M-1 \quad (3)$$

Here, $A_{n,m}$ denotes a real part symbol of $D_{n,m}$, and $B_{n,m}$ denotes an imaginary part symbol of $D_{n,m}$. Hereinafter, $A_{n,m}$ and $B_{n,m}$ are interpreted as described above.

Accordingly, a transmission signal generated by the mathematical structure of the DFT-spread FBMC/OQAM scheme shown in FIG. 2 may be expressed by Equation 4 below.

$$x(t) = \sum_{n=0}^{N-1} \sum_{m=0}^{M-1} \left\{ A_{n,m}h(t-mT) + jB_{n,m}h\left(t-mT-\frac{T}{2}\right) \right\} e^{jn\frac{2\pi}{T}(t+\frac{T}{4})} \quad (4)$$

As can be apparent from Equation 4, the transmission signal generated by the mathematical structure shown in FIG. 2 is composed of subcarriers that are identically time-shifted by T/4.

Meanwhile, when it is assumed that h(t)=1 for 0≤t≤T and h(t)=0 for other time intervals in Equation 4, Equation 4 in an interval of mT+T/2≤t≤(m+1)T may be expressed by Equation 5 below.

$$x(t) = \sum_{n=0}^{N-1} \{A_{n,m} + jB_{n,m}\} e^{jn\frac{2\pi}{T}(t+\frac{T}{4})} \quad (5)$$

As can be apparent from Equation 5, the transmission signal generated by the mathematical structure shown in FIG. 2 is similar to a single carrier-frequency division multiple access (SC-FDMA) signal within an overlapping symbol duration of an I-channel and a Q-channel, and thus a PAPR reduction effect may be expected within at least the overlapping symbol duration.

Figure 3:
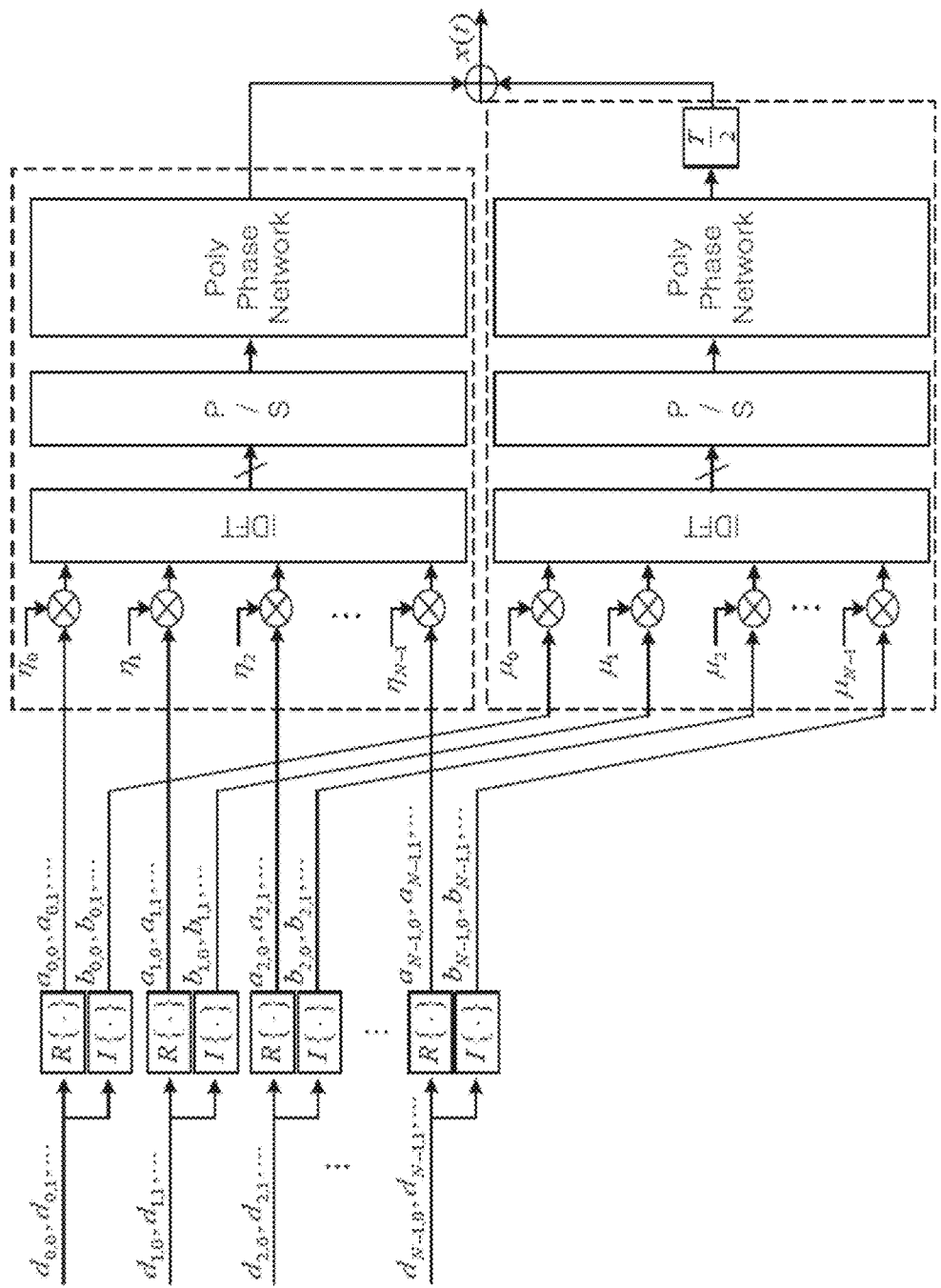
FIG. 3 is a diagram illustrating an actual implementation structure of the mathematical structure shown in FIG. 1.

FIG. 3 is a diagram illustrating an actual implementation structure of the mathematical structure shown in FIG. 1.

Referring to FIG. 3, parallel input data symbols are divided into real part symbols $a_{n,m}$ and imaginary part symbols $b_{n,m}$ and then the divided real part symbols and imaginary part symbols are multiplied by phase shift coefficients $\eta_n$ and $\mu_n$, respectively. In this case, the phase shift coefficients $\eta_n$ and $\mu_n$ must satisfy the following Equations 6 and 7 so that a generated transmission signal satisfies an FBMC signal format.

$$\eta_n = \begin{cases} 1 \text{ (or } -1) \text{ if } n = \text{even} \\ j \text{ (or } -j) \text{ if } n = \text{odd} \end{cases} \quad (6)$$

-continued $$\mu_n = \begin{cases} j \text{ (or } -j\text{) if } n = \text{even} \\ 1 \text{ (or } -1\text{) if } n = \text{odd} \end{cases} \quad (7)$$

Here, $\eta_n$ denotes the phase shift coefficient to be multiplied to the real part symbols $a_{n,m}$ to be transmitted by an $n^{th}$ subcarrier and $\mu_n$ denotes the phase shift coefficient to be multiplied to the imaginary part symbols $b_{n,m}$ to be transmitted by the $n^{th}$ subcarrier.

Meanwhile, pulse shaping and multi-carrier modulation using the prototype filter shown in FIG. 1 is implemented through inverse discrete Fourier transform (IDFT), parallel/serial conversion after IDFT, and a poly phase network (PPN), and an output of a lower PPN is time-shifted by T/2 in order to apply a time offset between symbols of the I and Q-channels.

Figure 4:
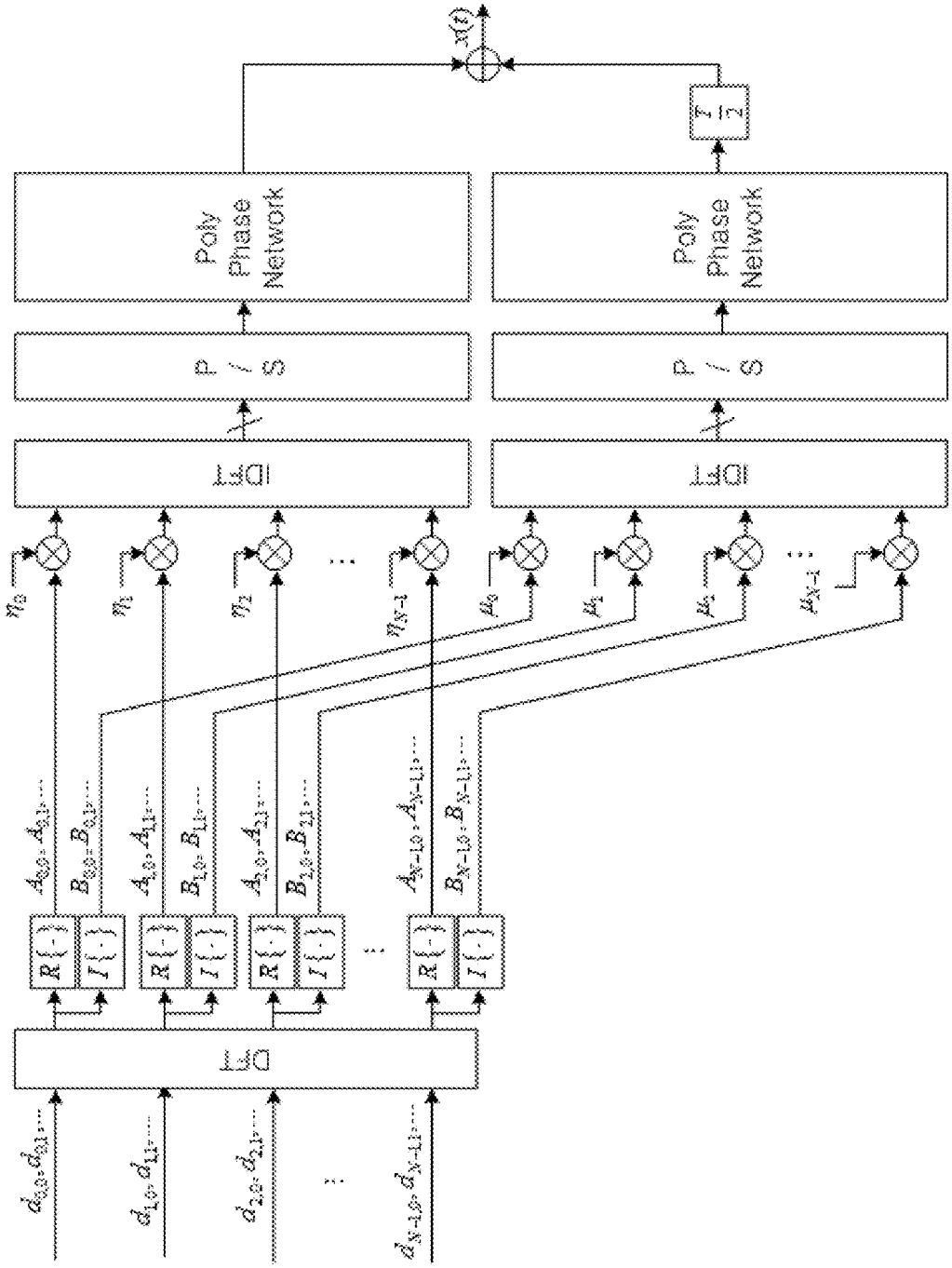
FIG. 4 is a diagram illustrating an actual implementation structure of the mathematical structure shown in FIG. 2.

FIG. 4 is a diagram illustrating an actual implementation structure of the mathematical structure shown in FIG. 2.

Referring to FIG. 4, the actual implementation structure of the DFT-spread FBMC/OQAM scheme is substantially the same as the structure shown in FIG. 3, except that a DFT spreading process is preceded for parallel data symbols $d_{n,m}$.

In FIGS. 3 and 4, $\eta_n$ and $\mu_n$ may be set to any values as long as the conditions of the above Equations 6 and 7 are satisfied, but they are generally set according to the following Equation 8.

$$(\eta_0, \eta_1, \ldots, \eta_{N-1}) = (1, j, 1, j, \ldots,), (\mu_0, \mu_1, \ldots, \mu_{N-1}) = (j, 1, j, 1, \ldots,), \quad (8)$$

This is because no sign inversion is required for $\eta_n$ and $\mu_n$.

In the implementation structure shown in FIG. 4, when $\eta_n$ and $\mu_n$ are set according to Equation 8, a waveform of a transmission signal within an overlapping symbol duration of the I and Q-channels is expressed as Equation 9 below.

$$x(t) = \sum_{n=0}^{N-1} \{A_{n,m} + jB_{n,m}\} e^{jn\frac{2\pi}{T}(t+\tau_n)} \quad (9)$$

Here, $\tau_n$ is as below.

$$(\{\tau_0, \tau_1, \tau_2, \tau_3\}, \{\tau_4, \tau_5, \tau_6, \tau_7\}, \ldots,) (\{0, T/4, 0, -T/4\}, \{0, T/4, 0, -T/4\}, \ldots,) \quad (10)$$

As can be apparent from Equations 9 and 10, when $\eta_n$ and $\mu_n$ are set as shown in Equation 8 in the actual implementation structure of the DFT-spread FBMC/OQAM scheme, the subcarriers are subjected to different time shifts (i.e., 0, T/4 or −T/4). Therefore, unlike the mathematical structure shown in FIG. 2, a single carrier effect is not properly obtained, which causes the PAPR reduction effect due to DFT spreading to be degraded.

Thus, the subcarriers must be identically time-shifted on a time axis in order not to degrade the PAPR reduction effect due to DFT spreading, and it may be implemented by setting $\eta_n$ and $\mu_n$ to appropriate values as described below.

More specifically, the transmission signal according to the above Equation 4 is transformed as below according to the implementation structure shown in FIG. 4.

Since $$e^{jn\frac{2\pi}{T}\left(t+\frac{T}{4}\right)} = e^{jn\frac{\pi}{2}} e^{jn\frac{2\pi}{T}t} = j^n e^{jn\frac{2\pi}{T}t}$$

in Equation 4, Equation 4 may be expressed as Equation 11 below.

$$x(t) = \sum_{n=0}^{N-1} \sum_{m=0}^{M-1} j^n A_{n,m} h(t - mT) e^{jn\frac{2\pi}{T}t} + \sum_{n=0}^{N-1} \sum_{m=0}^{M-1} j \times j^n B_{n,m} h\left(t - mT - \frac{T}{2}\right) e^{jn\frac{2\pi}{T}t} \quad (11)$$

Thus, the first term $$\sum_{n=0}^{N-1} \sum_{m=0}^{M-1} j^n A_{n,m} h(t - mT) e^{jn\frac{2\pi}{T}t}$$

in Equation 11 may be generated by setting $\eta_n$ in the implementation structure of FIG. 4 as shown in Equation 12 below.

$$\eta_n = j^n \quad (12)$$

Meanwhile, the second term $$\sum_{n=0}^{N-1} \sum_{m=0}^{M-1} j \times j^n B_{n,m} h\left(t - mT - \frac{T}{2}\right) e^{jn\frac{2\pi}{T}t}$$

in Equation 11 may be expressed as Equation 13 below.

$$\sum_{n=0}^{N-1} \sum_{m=0}^{M-1} j \times j^n B_{n,m} h\left(t - mT - \frac{T}{2}\right) e^{jn\frac{2\pi}{T}t} = \sum_{n=0}^{N-1} \sum_{m=0}^{M-1} j(-j)^n B_{n,m} h(t' - mT) e^{jn\frac{2\pi}{T}t'}, \quad (13)$$

where $t' = t - \frac{T}{2}$

Therefore, the second term of Equation 11 may be generated by setting $\mu_n$ in the implementation structure of FIG. 4 as shown in Equation 14 below.

$$\mu_n = j(-j)^n \quad (14)$$

That is, $\eta_n$ and $\mu_n$ in the implementation structure shown in FIG. 4 are set according to Equation 12 and Equation 14, respectively, so that a transmission signal in which subcarriers are identically time-shifted by T/4 can be generated as shown in Equation 4. Accordingly, the PAPR can be reduced within an overlapping symbol duration of the I-channel and the Q-channel.

In addition, since $\eta_n$ and $\mu_n$ set according to Equations 12 and 14 satisfy the conditions of Equation 6 and Equation 7, respectively, the generated transmission signal satisfies the FMBC signal format.

When a time shift for each subcarrier is changed from T/4 to T/4 in Equation 4, a transmission signal may be generated as shown in Equation 15 below.

$$x(t) = \sum_{n=0}^{N-1} \sum_{m=0}^{M-1} \left\{ A_{n,m} h(t - mT) + jB_{n,m} h\left(t - mT - \frac{T}{2}\right) \right\} e^{jn\frac{2\pi}{T}\left(t - \frac{T}{4}\right)} \quad (15)$$

It can be seen that, through the derivation process similar to Equations 11 to 14, the transmission signal according to Equation 15 may be generated by setting $\eta_n$ and $\mu_n$ in the implementation structure of FIG. 4 as shown in the following Equation 16 and Equation 17, respectively.

$$\eta_n = (-j)^n \quad (16)$$

$$\mu_n = (j)^{n+1} \quad (17)$$

That is, by setting $\eta_n$ and $\mu_n$ in the implementation structure of FIG. 4 according to Equation 16 and Equation 17, respectively, the transmission signal in which subcarriers are identically time-shifted by $-T/4$ can be generated, and $\eta_n$ and $\mu_n$ set according to Equation 16 and Equation 17 also satisfy the conditions of the above Equation 6 and Equation 7, respectively.

Figure 5:
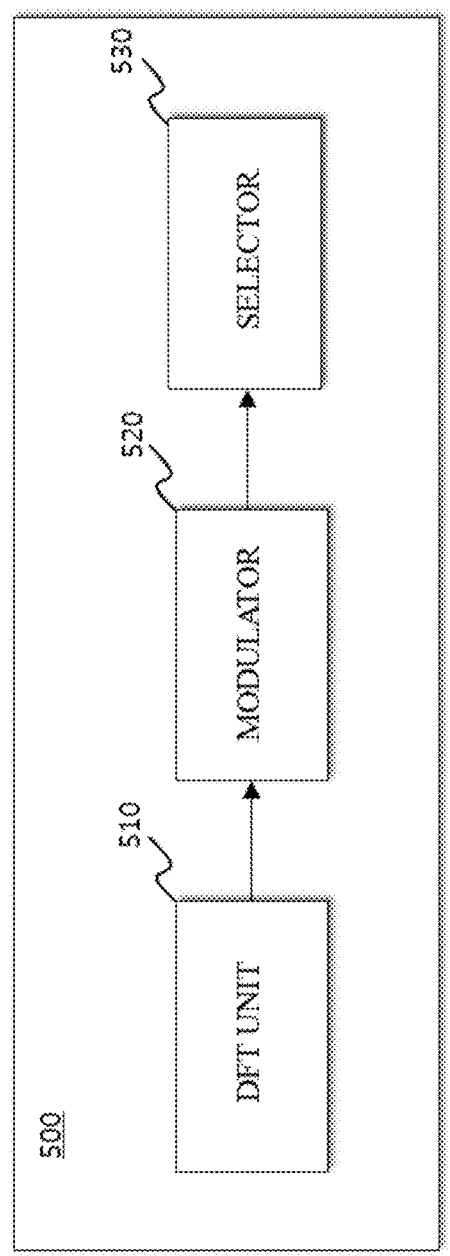
FIG. 5 is a block diagram illustrating a modulation apparatus according to one exemplary embodiment of the present disclosure.

FIG. 5 is a block diagram illustrating a modulation apparatus according to one exemplary embodiment of the present disclosure.

Referring to FIG. 5, the modulation apparatus 500 according to one exemplary embodiment of the present disclosure includes a DFT performer 510, a modulator 520, and a selector 530.

The DFT performer 510 performs DFT on parallel input data symbols to generate DFT-spread data symbols.

The modulator 520 generates a plurality of different candidate transmission signals, each composed of identically time-shifted subcarriers, by dividing the data symbols DFT-spread by the DFT performer 510 into real part symbols and imaginary part symbols, multiplying the divided symbols by phase shift coefficients, and modulating the multiplied symbols using the FBMC/OQAM scheme.

That is, each of the candidate transmission signals generated by the modulator 520 is a signal modulated by a DFT-spread FBMC/OQAM scheme and is composed of identically time-shifted subcarriers. More specifically, the subcarriers constituting the same candidate transmission signal are identically time-shifted, and time shifts of the subcarriers that constitute different candidate transmission signals may be the same or different from each other.

The selector 530 selects a signal having the smallest peak power or the smallest PAPR from the plurality of candidate transmission signals generated by the modulator 520 as a transmission signal.

In this case, the selector 530 may multiply the plurality of candidate transmission signals generated by the modulator 520 by an arbitrary complex constant and then select a signal having the smallest peak power or the smallest PAPR as a transmission signal.

Figure 6:
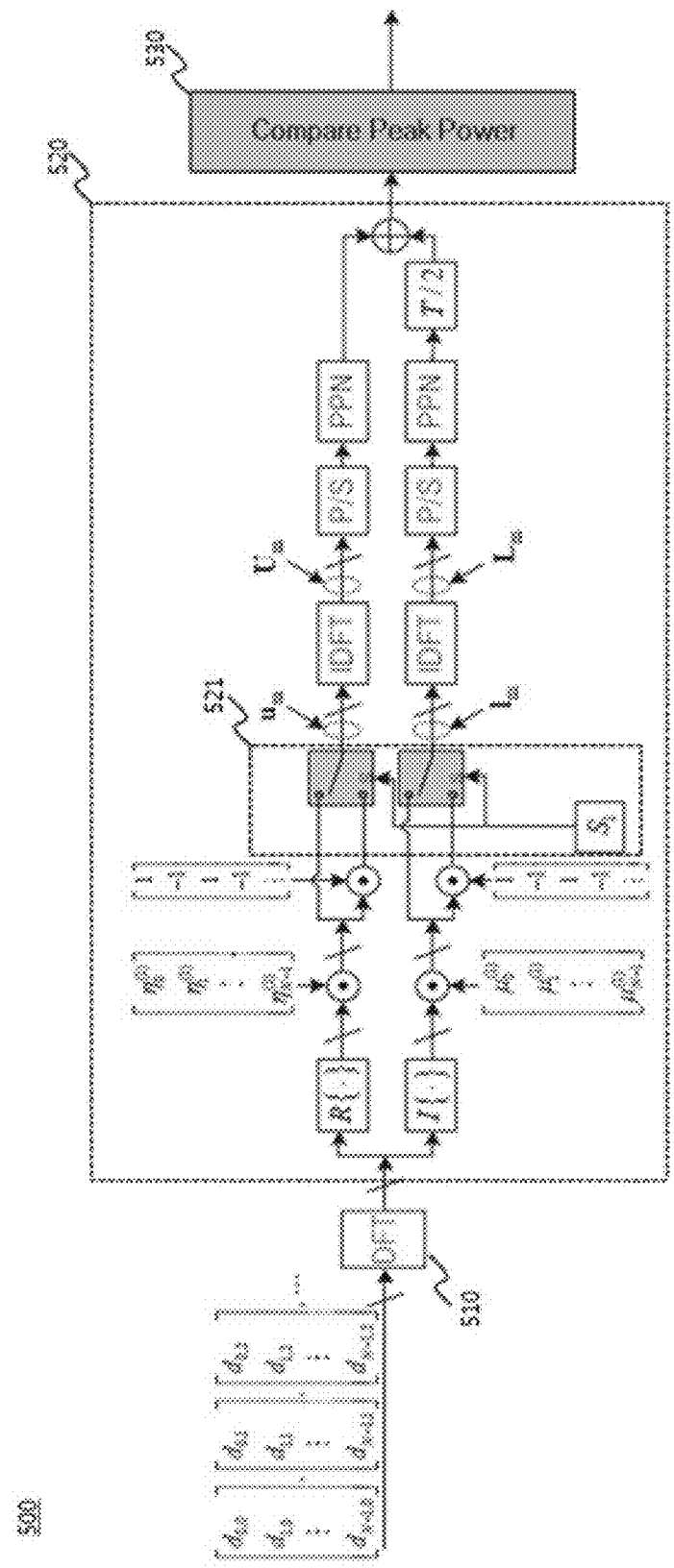
FIG. 6 is a diagram illustrating in detail a modulation apparatus according to a first embodiment of the present disclosure.

FIG. 6 is a diagram illustrating in detail a modulation apparatus according to a first embodiment of the present disclosure.

Referring to FIG. 6, a DFT performer 510 generates DFT-spread data symbols by performing DFT on parallel input data symbols.

A modulator 520 generates two candidate transmission signals for the DFT-spread data symbols. In this case, each of the two generated candidate transmission signals is modulated by the same scheme as in the structure shown in FIG. 4.

Specifically, the modulator 520 generates a candidate transmission signal $x^{(1)}(t)$ satisfying the above Equation 4 and a candidate transmission signal $x^{(2)}(t)$ satisfying the above Equation 5.

From the above discussion, it can be seen that phase shift coefficients $\eta_n^{(v)}$ and $\mu_n^{(v)}$ which should be set to produce $x^{(v)}(t)$ (where $v=1, 2$) are as shown in Equation 18 and Equation 19.

$$\eta_n^{(1)} = \chi j^n, \mu_n^{(1)} = \chi j(-j)^n \quad (18)$$

$$\eta_n^{(2)} = \chi(-j)^n, \mu_n^{(2)} = \chi(j)^{n+1} \quad (19)$$

here, $\chi$ denotes an any complex number on a unit circle, i.e., $|\chi|=1$.

In addition, by comparing Equation 18 and Equation 19, the following relationship may be obtained.

$$\eta_n^{(2)} = \begin{cases} \eta_n^{(1)} & \text{if } n = \text{even} \\ -\eta_n^{(1)} & \text{if } n = \text{odd} \end{cases} \quad (20)$$

$$\mu_n^{(2)} = \begin{cases} \mu_n^{(1)} & \text{if } n = \text{even} \\ -\mu_n^{(1)} & \text{if } n = \text{odd} \end{cases} \quad (21)$$

Consequently, the modulator 520 may inverse signs of odd index symbols among the real part symbols and the imaginary part symbols which are multiplied by the phase shift coefficients $\eta_n^{(1)}$ and $\mu_n^{(1)}$, respectively, as shown in FIG. 5, and thereby may change the symbols to real part symbols and imaginary part symbols which are multiplied by $\eta_n^{(2)}$ and $\mu_n^{(2)}$ respectively.

In addition, the modulator 520 may generate the two candidate transmission signals $x^{(1)}(t)$ and $x^{(2)}(t)$ by controlling a switching operation by setting a control bit $S_1$ of a switch 521 as shown below, wherein the switch 521 selects the real part symbols and imaginary part symbols multiplied by $\eta_n^{(1)}$ and $\mu_n^{(1)}$ as inputs of IDFT or selects the real part symbols and the imaginary part symbols in which sign-inversion is applied to odd index symbols after the real part symbols and the imaginary part symbols are multiplied by $\eta_n^{(1)}$ and $\mu_n^{(1)}$ as inputs of IDFT.

| Candidate transmission signal | $S_1$ |
|---|---|
| $x^{(1)}(t)$ | 0 |
| $x^{(2)}(t)$ | 1 |

More specifically, when $S_1=0$, the switch 521 inputs the real part symbols and imaginary part symbols multiplied by $\eta_n^{(1)}$ and $\mu_n^{(1)}$ to IDFT, and a candidate transmission signal $x^{(1)}(t)$ thus generated is expressed as Equation 22 below.

$$x^{(1)}(t) = \sum_{n=0}^{N-1}\sum_{m=0}^{M-1}\left\{\eta_n^{(1)}A_{n,m}h(t-mT) + (-1)^n\mu_n^{(1)}B_{n,m}h\left(t-mT-\frac{T}{2}\right)\right\}e^{jn\frac{2\pi}{T}} \quad (22)$$

In addition, when $S_1=1$, the switch 521 inputs the real part symbols and the imaginary part symbols in which sign-inversion is applied to odd index symbols after the real part symbols and the imaginary part symbols are multiplied by $\eta_n^{(1)}$ and $\mu_n^{(1)}$ to IDFT, and a candidate transmission signal $x^{(2)}(t)$ thus generated is as shown in Equation 23 below.

$$x^{(2)}(t) = \sum_{n=0}^{N-1}\sum_{m=0}^{M-1}\left\{\eta_n^{(2)}A_{n,m}h(t-mT) + (-1)^n\mu_n^{(2)}B_{n,m}h\left(t-mT-\frac{T}{2}\right)\right\}e^{jn\frac{2\pi}{T}} \quad (23)$$

The selector 530 selects a candidate transmission signal having the smallest peak power or the smallest PAPR from the two candidate transmission signals generated by the modulator 520 as a final transmission signal. In this case, according to one exemplary embodiment of the present disclosure, the selector 530 may multiply the two candidate transmission signals according to the above Equations 22 and 23 by an arbitrary complex constant, and then select a signal having the smallest peak power or the smallest PAPR as a transmission signal.

Meanwhile, in the example shown in FIG. 6, phase shift coefficients are set to $\eta_n^{(1)}$ and $\mu_n^{(1)}$, but are not necessarily limited thereto, and may be set to $\eta_n^{(2)}$ and $\mu_n^{(2)}$.

In addition, in the example shown in FIG. 6, a lower PPN output is delayed by T/2, but is not limited thereto. The modulator 520 may delay an upper PPN output by T/2 according to an exemplary embodiment. In this case, the two generated candidate transmission signals are expressed as Equations 24 and 25 below.

$$x^{(1)}(t) = \sum_{n=0}^{N-1}\sum_{m=0}^{M-1}\left\{\eta_n^{(1)} A_{n,m} h\left(t-mT-\frac{T}{2}\right) + (-1)^n \mu_n^{(1)} B_{n,m} h(t-mT)\right\} e^{jn\frac{2\pi}{T}} \quad (24)$$

$$x^{(2)}(t) = \sum_{n=0}^{N-1}\sum_{m=0}^{M-1}\left\{\eta_n^{(2)} A_{n,m} h\left(t-mT-\frac{T}{2}\right) + (-1)^n \mu_n^{(2)} B_{n,m} h(t-mT)\right\} e^{jn\frac{2\pi}{T}} \quad (25)$$

Meanwhile, in the example shown in FIG. 6, the modulator 520 may generate two candidate transmission signals satisfying Equations 22 and 23 and thereafter multiply the signals by an imaginary number j, or may generate two candidate transmission signals satisfying Equations 24 and 25 and thereafter multiply the signals by the imaginary number j, according to an exemplary embodiment. In this case, the selector 530 may select a signal having the smallest peak power or the smallest PAPR from the two candidate transmission signals multiplied by the imaginary number j as a transmission signal.

Figure 7:
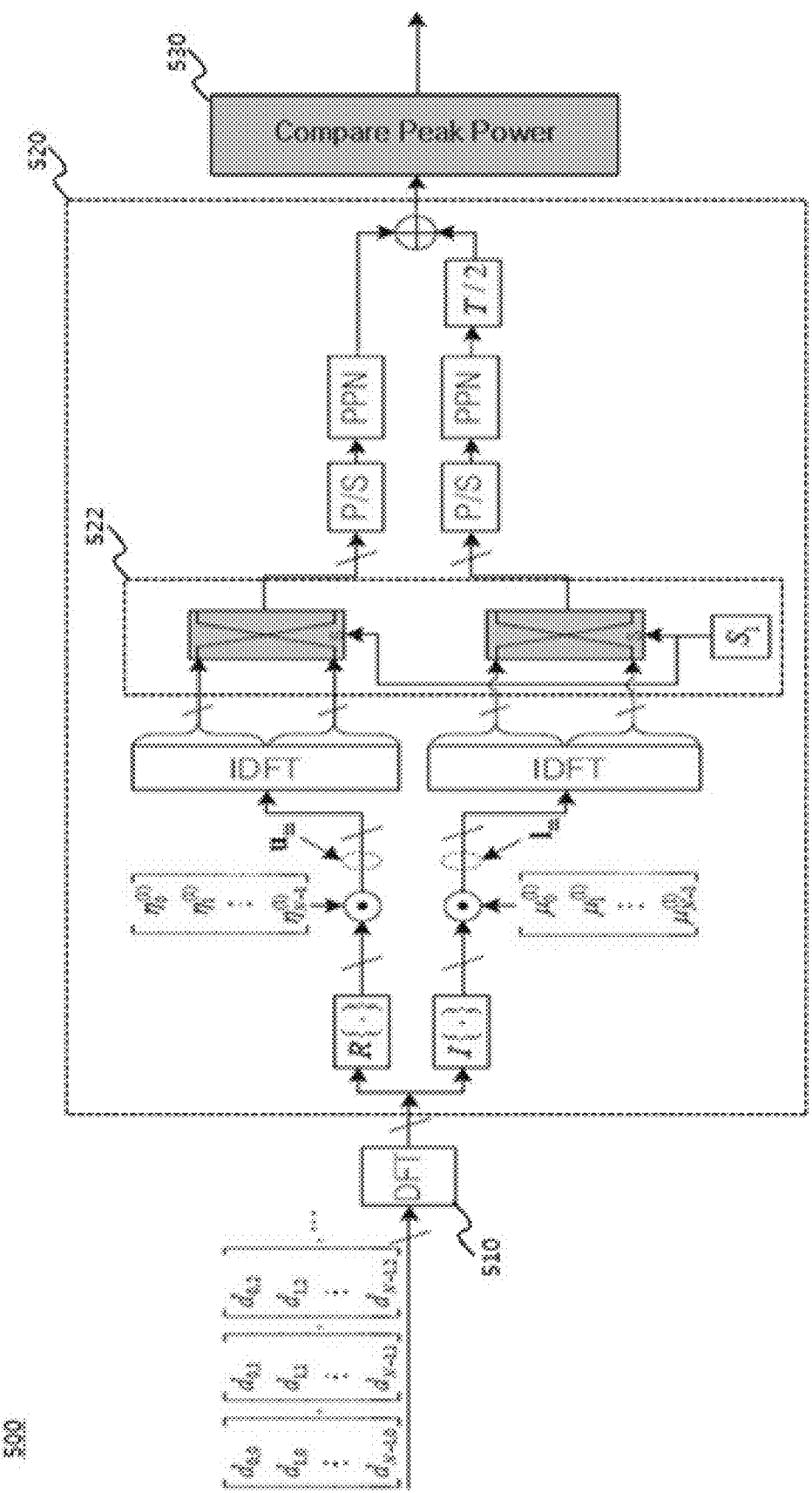
FIG. 7 is a diagram illustrating in detail a modulation apparatus according to a second exemplary embodiment of the present disclosure.

FIG. 7 is a diagram illustrating in detail a modulation apparatus according to a second exemplary embodiment of the present disclosure.

In the exemplary embodiment shown in FIG. 7, a DFT performer 510 and a selector 530 are substantially the same as the configurations shown in FIG. 6, and thus redundant description thereof will be omitted.

Referring to FIG. 7, unlike in the exemplary embodiment shown in FIG. 6, a modulator 520 applies IDFT to real part symbols and imaginary part symbols multiplied by phase shift coefficients $\eta_n^{(1)}$ and $\mu_n^{(1)}$, and then generates two candidate transmission signals $x^{(1)}(t)$ and $x^{(2)}(t)$ that satisfy the above Equations 22 and 23, respectively, through a switching operation of a switch 522 that switches an output of the IDFT.

More specifically, in the exemplary embodiment shown in FIG. 6, a vector $u_m$ of symbols input to an upper IDFT is changed according to a switching operation of a switch 521.

In the exemplary embodiment shown in FIG. 6, when a vector of symbols input to the upper IDFT when $S_1=0$ is represented as $u_m^{(S_1=0)}$ and a vector of symbols input to the upper IDFT when $S_1=1$ is represented as $u_m^{(S_1=1)}$, $u_m^{(S_1=1)}$ is expressed as Equation 26 below.

$$u_m^{(S_1=1)} = [1,-1,1,-1,\ldots,-1] \odot u_m^{(S_1=0)} = e^{j\pi\{0:(N-1)\}} \odot u_m^{(S_1=0)} \quad (26)$$

Here, $\odot$ represents multiplication by element.

Output vectors $U_m^{(S_1=0)}$ and $U_m^{(S_1=1)}$ of the upper IDFT for $u_m^{(S_1=0)}$ and $u_m^{(S_1=1)}$, respectively, are as follows.

$$U_m^{(S_1=0)} = \text{IDFT}[u_m^{(S_1=0)}] \quad (27)$$

$$U_m^{(S_1=1)} = \text{IDFT}[u_m^{(S_1=1)}] \quad (28)$$

Further, when Equation 26 is substituted into Equation 28, the following Equation 29 can be derived.

$$U_m^{(S_1=1)} = \text{IDFT}[e^{j\pi\{0:(N-1)\}} \odot u_m^{(S_1=0)}] = \text{IDFT}[e^{j\pi\{0:(N-1)\}}] * \text{IDFT}[u_m^{(S_1=0)}] = \text{IDFT}[e^{j\pi\{0:(N-1)\}}] * U_m^{(S_1=0)} \quad (29)$$

Here, * represents a cyclic convolution.

In addition, since N is generally set to an even real number, such as a power of 2, a characteristic as shown in the following Equation 30 is obtained.

$$\text{IDFT}[e^{j\pi\{0:(N-1)\}}] = [\underbrace{0,\ldots,0}_{N/2}, 1, \underbrace{0,\ldots,0}_{N/2-1}] \quad (30)$$

From this characteristic, it can be seen that $U_m^{(S_1=1)}$ is generated by cyclically shifting $U_m^{(S_1=1)}$ by N/2 as shown in Equation 31 below.

$$U_m^{(S_1=1)} = [U_m^{(S_1=0)}(N/2:N-1) U_m^{(S_1=0)}(0:N/2-1)] \quad (31)$$

This is equivalent to a vector obtained by switching the left half and the right half of $U_m^{(S_1=0)}$.

Similarly, in the exemplary embodiment shown in FIG. 6, vectors of symbols input to a lower IDFT according to a switching operation of the switch 521 may be expressed as $l_m^{(S_1=0)}$ and $l_m^{(S_1=1)}$, and an output vector $L_m^{(S_1=1)}$ of the lower IDFT is equivalent to a vector obtained by switching the left half and the right half of $L_m^{(S_1=0)}$, as shown in Equation 32.

$$L_m^{(S_1=1)} = [L_m^{(S_1=0)}(N/2:N-1) L_m^{(S_1=0)}(0:N/2-1)] \quad (32)$$

Therefore, in the exemplary embodiment shown in FIG. 7, the modulator 520 applies IDFT to the real part symbols and imaginary part symbols multiplied by the phase shift coefficients $\eta_n^{(1)}$ and $\mu_n^{(1)}$, and then switches $0^{th}$ to $(N/2-1)^{th}$ outputs and $(N/2)^{th}$ to $(N-1)^{th}$ outputs, respectively, among outputs of the IDFT applied to the real part symbols and outputs of the IDFT applied to the imaginary part symbols, thereby generating two candidate transmission signals $x^{(1)}(t)$ and $x^{(2)}(t)$ that satisfy the above Equations 22 and 23, respectively.

More specifically, the two candidate transmission signals may be generated by controlling a control bit $S_1$ of the switch 522 as shown below.

| Candidate transmission signal | $S_1$ |
|---|---|
| $x^{(1)}(t)$ | 0 |
| $x^{(2)}(t)$ | 1 |

In this case, when $S_1=0$, the switch 522 inputs outputs of the IDFTs to PPN without switching the outputs, and accordingly the candidate transmission signal $x^{(1)}(t)$ satisfying the above Equation 22 is generated.

On the other hand, when $S_1=1$, the switch 522 switches the $0^{th}$ to the $(N/2-1)^{th}$ outputs and the $(N/2)^{th}$ to the $(N-1)^{th}$ among the outputs of each IDFT and inputs the switching results to the PPN, and accordingly, the candidate transmission signal $x^{(2)}(t)$ satisfying the above Equation 23 is generated.

In the exemplary embodiment shown in FIG. 7, phase shift coefficients are set to $\eta_n^{(1)}$ and $\mu_n^{(1)}$, but are not necessarily limited thereto, and may be set to $\eta_n^{(2)}$ and $\mu_n^{(2)}$.

In addition, in the exemplary embodiment shown in FIG. 7, a lower PPN output is delayed by T/2, but is not necessarily limited thereto. The modulator 520 may delay an upper PPN output by T/2 according to an exemplary embodiment. In this case, the two generated candidate transmission signals satisfy the above Equations 24 and 25, respectively.

Meanwhile, in the example shown in FIG. 7, the modulator 520 may generate two candidate transmission signals satisfying Equations 22 and 23 and then multiply the generated signals by an imaginary number j, or may generate two candidate transmission signals satisfying Equations 24 and 25 and then multiply the generated signals by the imaginary number j. In this case, the selector 530 may select a signal having the smallest peak power or the smallest PAPR as a transmission signal.

Figure 8:
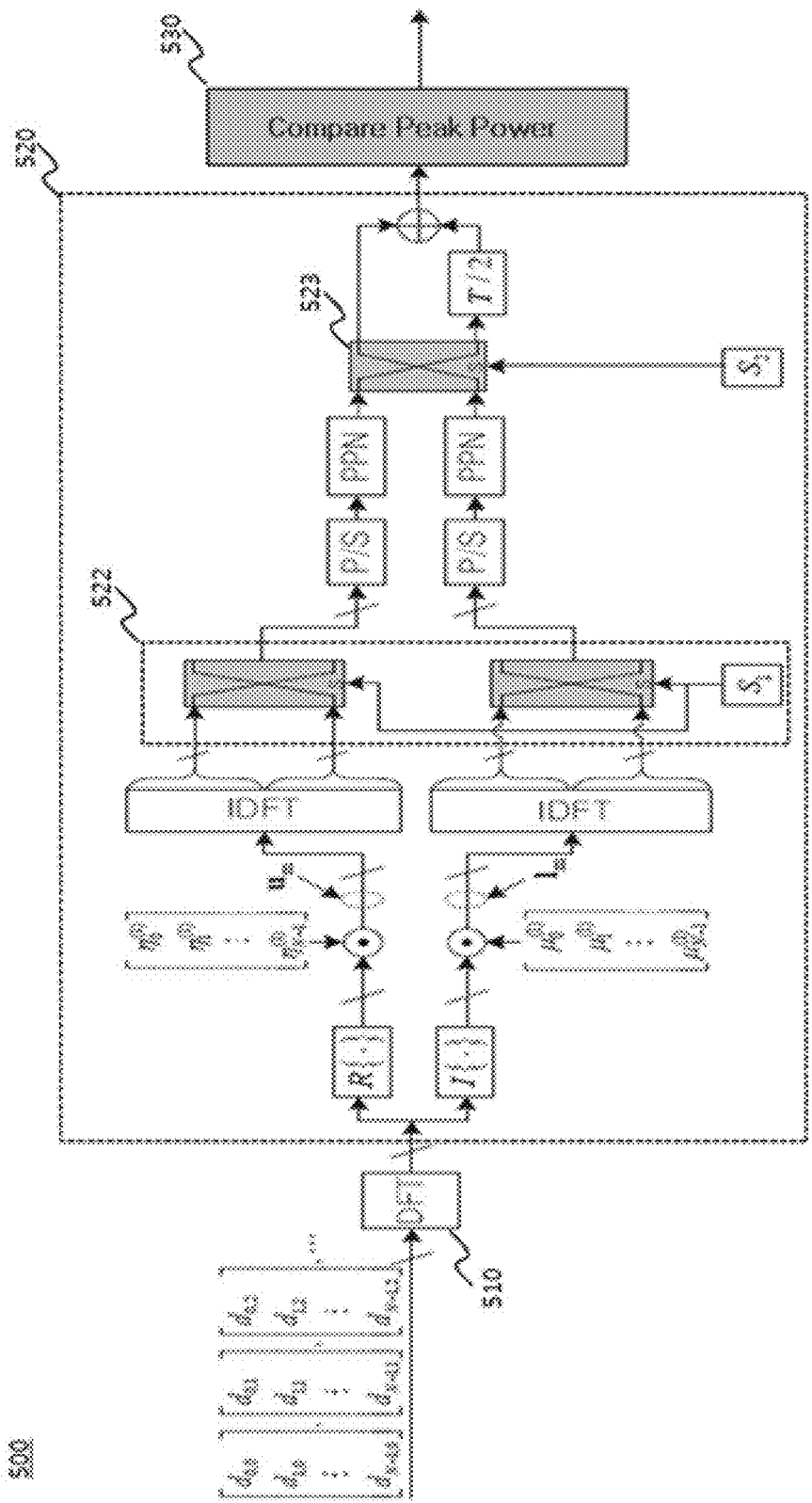
FIG. 8 is a diagram illustrating in detail a modulation apparatus according to a third exemplary embodiment of the present disclosure.

FIG. 8 is a diagram illustrating in detail a modulation apparatus according to a third exemplary embodiment of the present disclosure.

In the exemplary embodiment shown in FIG. 8, a DFT performer 510 is substantially the same as the configuration shown in FIGS. 6 and 7, and thus redundant description thereof will be omitted.

When FIG. 8 and FIG. 7 are compared, the exemplary embodiment shown in FIG. 8 is substantially the same as the exemplary embodiment shown in FIG. 7 in terms of the structure, except that a switch 523 is added to select an output to be time-shift by T/2 from an output of an upper PPN and an output of a lower PPN.

However, in the exemplary embodiment shown in FIG. 8, unlike the exemplary embodiment shown in FIG. 7, two candidate transmission signals $x^{(3)}(t)$ and $x^{(4)}(t)$ of the same forms as the above Equations 24 and 25 are additionally generated by a switching operation of the switch 523, in addition to two candidate transmission signals $x^{(1)}(t)$ and $x^{(2)}(t)$ that satisfy the above Equations 22 and 23, respectively.

More specifically, the two additionally generated candidate transmission signals $x^{(3)}(t)$ and $x^{(4)}(t)$ are expressed as Equations 33 and 34, respectively.

$$x^{(3)}(t) = \sum_{n=0}^{N-1}\sum_{m=0}^{M-1}\left\{\eta_n^{(1)} A_{n,m} h\left(t - mT - \frac{T}{2}\right) + (-1)^n \mu_n^{(1)} B_{n,m} h(t - mT)\right\} e^{jn\frac{2\pi}{T}} \quad (33)$$

$$x^{(4)}(t) = \sum_{n=0}^{N-1}\sum_{m=0}^{M-1}\left\{\eta_n^{(2)} A_{n,m} h\left(t - mT - \frac{T}{2}\right) + (-1)^n \mu_n^{(2)} B_{n,m} h(t - mT)\right\} e^{jn\frac{2\pi}{T}} \quad (34)$$

When Equation 22 and Equation 33 are compared, a Q-channel of $x^{(1)}(t)$ is delayed by a half of a symbol duration (i.e., T/2), but an I-channel, not a Q-channel, of $x^{(3)}(t)$ is delayed by a half of a symbol duration.

In addition, when Equation 23 and Equation 34 are compared, a Q-channel of $x^{(2)}(t)$ is delayed by a half of a symbol duration, but an I-channel, not a Q-channel, of $x^{(4)}(t)$ is delayed by a half of a symbol duration.

Thus, in the exemplary embodiment shown in FIG. 8, the four candidate transmission signals $x^{(1)}(t)$, $x^{(2)}(t)$, $x^{(3)}(t)$, and $x^{(4)}(t)$ may be generated by controlling a control bit $S_1$ of a switch 522 and a control bit $S_2$ of the switch 523 as shown below.

| Candidate transmission signal | $S_1$ | $S_2$ |
| --- | --- | --- |
| $x_I^{(1)}(t)$ | 0 | 0 |
| $x_I^{(2)}(t)$ | 1 | 0 |
| $x_I^{(3)}(t)$ | 1 | 1 |
| $x_I^{(4)}(t)$ | 0 | 1 |

In this case, when $S_2=0$, an output of a lower PPN is delayed by T/2, and when $S_2=0$, an output of an upper PPN is delayed by T/2.

Since the four candidate transmission signals generated by the modulator 520 are signals in which subcarriers are identically time-shifted, a single carrier effect may be obtained within an overlapping duration of the I-channel and the Q-channel as described above.

In addition, assuming rectangular pulse shaping, $x^{(1)}(t)$ and $x^{(3)}(t)$ are the same in the overlapping duration of the I-channel and the Q-channel, regardless of which channel is delayed between the I-channel and the Q-channel.

However, a symbol of the delayed channel overlaps with the following OQAM symbol, and a symbol of the non-delayed channel overlaps with the preceding OQAM symbol, and thus signal parts out of the overlapping duration are different depending on which channel is delayed. Therefore, the entire waveforms of $x^{(1)}(t)$ and $x^{(3)}(t)$ differ from each other, and accordingly, peak powers of the two signals are different from each other.

This relationship equally applies to $x^{(2)}(t)$ and $x^{(4)}(t)$.

Hence, the selector 530 may select a candidate transmission signal having the smallest peak power or the smallest PAPR from the four candidate transmission signals $x^{(1)}(t)$, $x^{(2)}(t)$, $x^{(3)}(t)$, and $x^{(4)}(t)$ as a final transmission signal, and accordingly may improve the PAPR performance more.

In this case, according to one exemplary embodiment of the present disclosure, the selector 530 may multiply the four candidate transmission signals generated by the modulator 520 by an arbitrary complex constant, and then select a signal having the smallest peak power or the smallest PAPR as the transmission signal.

Meanwhile, in the example shown in FIG. 8, phase shift coefficients are set to $\eta_n^{(1)}$ and $\mu_n^{(1)}$, but are not necessarily limited thereto, and may be set to $\eta_n^{(2)}$ and $\mu_n^{(2)}$.

In addition, in the example shown in FIG. 8, the modulator 520 may generate four candidate transmission signals that satisfy Equations 22, 23, 33, and 34, and thereafter multiply an imaginary number j to the generated candidate transmission signals. In this case, the selector 530 may select a candidate transmission signal having the smallest peak power or the smallest PAPR from the four candidate transmission signals multiplied by the imaginary number j as a transmission signal.

Figure 9:
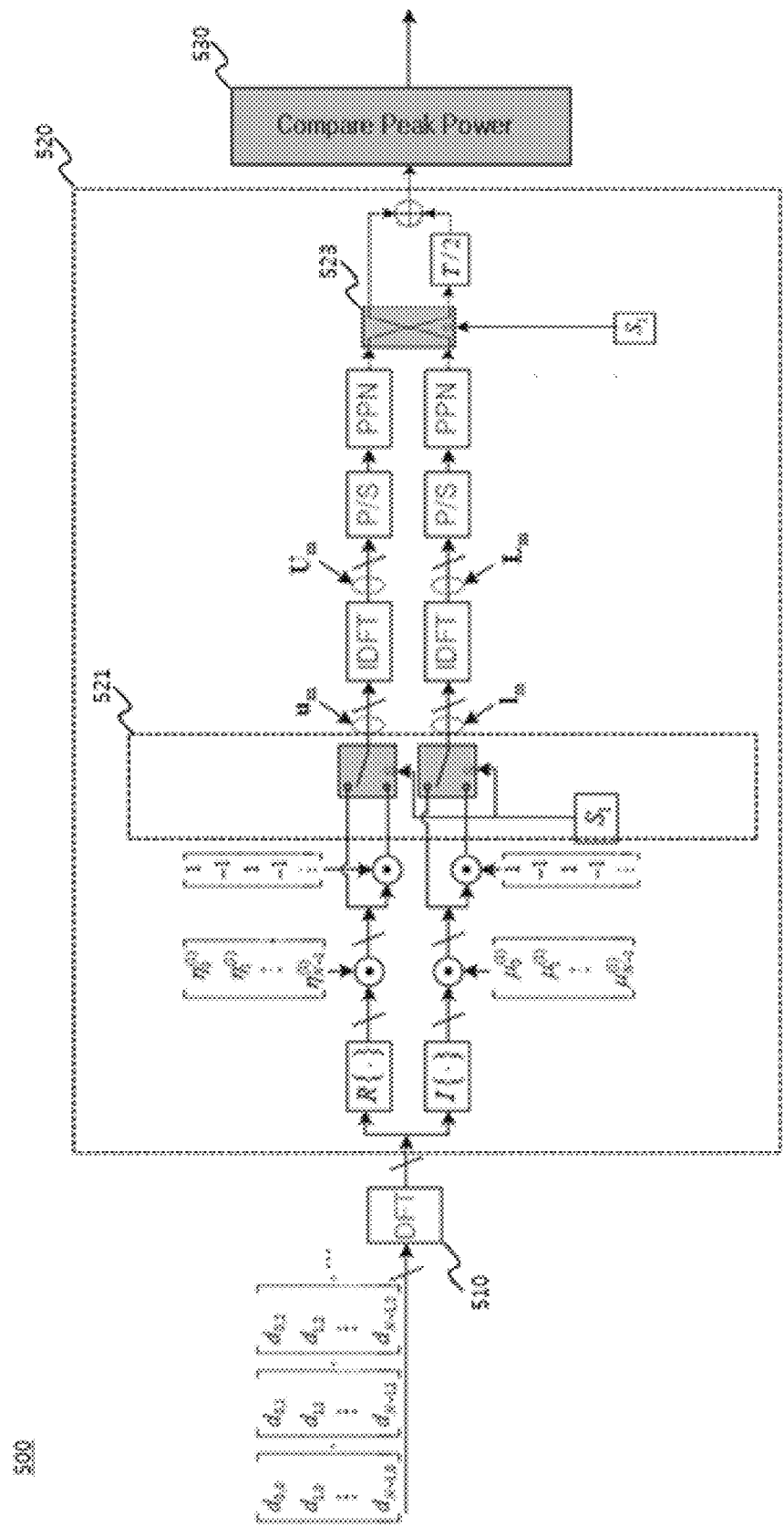
FIG. 9 is a diagram illustrating in detail a modulation apparatus according to a fourth exemplary embodiment of the present disclosure.

FIG. 9 is a diagram illustrating in detail a modulation apparatus according to a fourth exemplary embodiment of the present disclosure.

In the exemplary embodiment shown in FIG. 9, a DFT performer 510 is substantially the same as the configuration shown in FIGS. 6 to 8, a selector 530 is substantially the same as the configuration shown in FIG. 8, and thus redundant descriptions thereof will be omitted.

When FIG. 9 and FIG. 6 are compared, the exemplary embodiment shown in FIG. 9 is substantially the same as the exemplary embodiment shown in FIG. 6 in terms of the structure, except that a switch 523 is added to select an output to be time-shift by T/2 from an output of an upper PPN and an output of a lower PPN.

In addition, in the exemplary embodiment shown in FIG. 9, four candidate transmission signals that are the same as in the exemplary embodiment shown in FIG. 8 may be generated by switching operations of two switches 521 and 523.

More specifically, in the exemplary embodiment shown in FIG. 9, a modulator 520 may generate four candidate transmission signals $x^{(1)}(t)$, $x^{(2)}(t)$, $x^{(3)}(t)$, and $x^{(4)}(t)$ that satisfy Equations 22, 23, 33, and 34, respectively, and each of the candidate transmission signals may be generated by controlling a control bit $S_1$ of the switch 521 and a control bit $S_2$ of the switch 523 as shown below.

| Candidate transmission signal | $S_1$ | $S_2$ |
|---|---|---|
| $x_l^{(1)}(t)$ | 0 | 0 |
| $x_l^{(2)}(t)$ | 1 | 0 |
| $x_l^{(3)}(t)$ | 1 | 1 |
| $x_l^{(4)}(t)$ | 0 | 1 |

Meanwhile, in the example shown in FIG. 9, phase shift coefficients are set to $\eta_n^{(1)}$ and $\mu_n^{(1)}$, but are not necessarily limited thereto, and may be set to $\eta_n^{(2)}$ and $\mu_n^{(2)}$. In addition, in the example shown in FIG. 9, the modulator 520 may generate four candidate transmission signals that satisfy Equations 22, 23, 33, and 34, and thereafter multiply an imaginary number j to the generated candidate transmission signals. In this case, a selector 530 may select a candidate transmission signal having the smallest peak power or the smallest PAPR from the four candidate transmission signals multiplied by the imaginary number j as a transmission signal.

Figure 10:
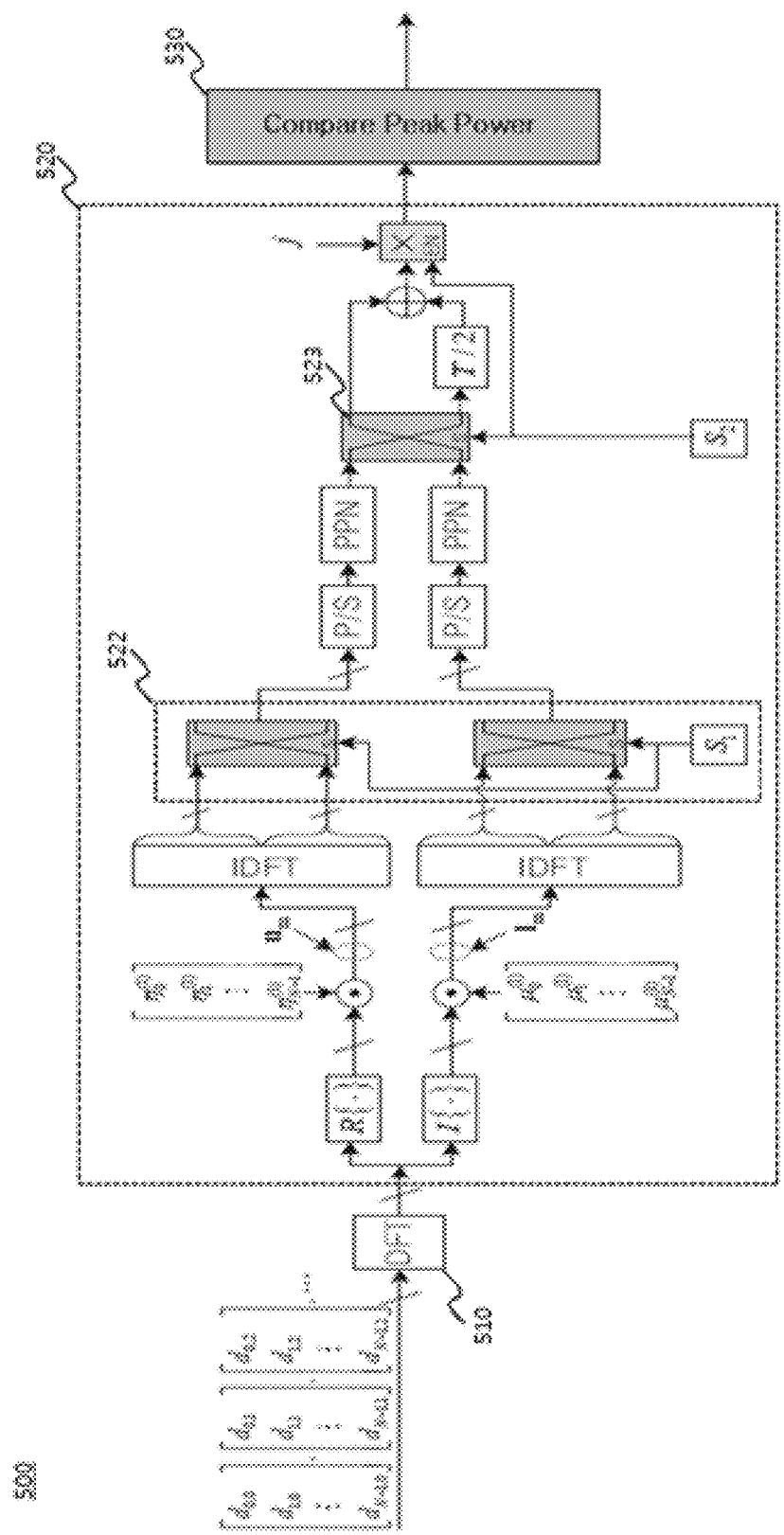
FIG. 10 is a diagram illustrating in detail a modulation apparatus according to a fifth exemplary embodiment of the present disclosure.

FIG. 10 is a diagram illustrating in detail a modulation apparatus according to a fifth exemplary embodiment of the present disclosure.

In the exemplary embodiment shown in FIG. 10, the modulation apparatus 500 divides one data frame into a plurality of consecutive data blocks, generates four candidate transmission signals for each of the data blocks, and selects a candidate transmission signal having the smallest peak power or the smallest PAPR from the four generated candidate transmission signals for each of the data blocks as a transmission signal for the corresponding data block. Then, the modulation apparatus 500 concatenates the transmission signals for each of the data blocks in order and generates a transmission signal for one entire data frame.

More specifically, a DFT performer 510 generates DFT-spread data symbols by applying DFT to data symbols of an $l^{th}$ data block of the data frame.

A modulator 520 receives the data symbols of an $l^{th}$ data block spread by the DFT performer 510 and generates four candidate transmission signals $x_l^{(1)}(t)$, $x_l^{(2)}(t)$, $x_l^{(3)}(t)$, and $x_l^{(4)}(t)$ for the $l^{th}$ data block.

In this case, the modulator 520 generates the four candidate transmission signals $x_l^{(1)}(t)$, $x_l^{(2)}(t)$, $x_l^{(3)}(t)$, and $x_l^{(4)}(t)$ through the same process as in the modulator 520 of the exemplary embodiment shown in FIG. 3, and the resulting four candidate transmission signals $x_l^{(1)}(t)$, $x_l^{(2)}(t)$, $x_l^{(3)}(t)$, and $x_l^{(4)}(t)$ are the same as the following Equations 35 to 38.

$$x_l^{(1)}(t) = \sum_{n=0}^{N-1} \sum_{m=lW}^{(l+1)W-1} \left\{ \eta_n^{(1)} A_{n,m} h(t-mT) + (-1)^n \mu_n^{(1)} B_{n,m} h\left(t-mT-\frac{T}{2}\right) \right\} e^{jn\frac{2\pi}{T}} \quad (35)$$

$$x_l^{(2)}(t) = \sum_{n=0}^{N-1} \sum_{m=lW}^{(l+1)W-1} \left\{ \eta_n^{(2)} A_{n,m} h(t-mT) + (-1)^n \mu_n^{(2)} B_{n,m} h\left(t-mT-\frac{T}{2}\right) \right\} e^{jn\frac{2\pi}{T}} \quad (36)$$

$$x_l^{(3)}(t) = \sum_{n=0}^{N-1} \sum_{m=lW}^{(l+1)W-1} \left\{ \eta_n^{(1)} A_{n,m} h\left(t-mT-\frac{T}{2}\right) + (-1)^n \mu_n^{(1)} B_{n,m} h(t-mT) \right\} e^{jn\frac{2\pi}{T}} \quad (37)$$

$$x_l^{(4)}(t) = \sum_{n=0}^{N-1} \sum_{m=lW}^{(l+1)W-1} \left\{ \eta_n^{(2)} A_{n,m} h\left(t-mT-\frac{T}{2}\right) + (-1)^n \mu_n^{(2)} B_{n,m} h(t-mT) \right\} e^{jn\frac{2\pi}{T}} \quad (38)$$

Here, W denotes a length of a data block, and l denotes an index of a data block, which is a real number satisfying $0 \le l \le L-1$. In addition, L denotes the number of divided data blocks.

Specifically, the modulator 520 may generate the candidate transmission signals $x_l^{(1)}(t)$, $x_l^{(2)}(t)$, $x_l^{(3)}(t)$, and $x_l^{(4)}(t)$ by controlling a control bit $S_1$ of a switch 522 and a control bit $S_2$ of a switch 523 as shown below.

| Candidate transmission signal | $S_1$ | $S_2$ |
|---|---|---|
| $x_l^{(1)}(t)$ | 0 | 0 |
| $x_l^{(2)}(t)$ | 1 | 0 |
| $x_l^{(3)}(t)$ | 1 | 1 |
| $x_l^{(4)}(t)$ | 0 | 1 |

Referring to Equations 35 to 38, it can be seen that in the case of $x_l^{(1)}(t)$ and $x_l^{(2)}(t)$, an imaginary number j is multiplied to a delayed channel and in the case of $x_l^{(3)}(t)$ and $x_l^{(4)}(t)$, an imaginary number j is multiplied to a preceding channel.

This is not a problem when a transmission signal for one data block is transmitted. However, transmission signals for each of the respective consecutive data blocks need to be concatenated in order to generate a transmission signal for one entire data frame, and in this case, conditions according to Equation 6 and Equation 7 are not satisfied.

For example, $x_l^{(3)}(t)$ or $x_l^{(4)}(t)$ and $x_{l-1}^{(1)}(t)$ or $x_{l-1}^{(2)}(t)$ cannot be concatenated.

To solve such a problem, when, for example, $x_l^{(3)}(t)$ or $x_l^{(4)}(t)$ is generated by setting the control bit $S_2$ of the switch 523 to 1, the modulator 520 may correct $x_l^{(3)}(t)$ and $x_l^{(4)}(t)$ as shown in the following Equations 39 and 40, respectively, by multiplying the imaginary number j.

$$x_l^{(3)}(t) = \sum_{n=0}^{N-1} \sum_{m=lW}^{(l+1)W-1} \left\{ j\eta_n^{(1)} A_{n,m} h\left(t-mT-\frac{T}{2}\right) - (-1)^n \mu_n^{(1)} B_{n,m} h(t-mt) \right\} e^{jn\frac{2\pi}{T}} \quad (39)$$

$$x_l^{(4)}(t) = \sum_{n=0}^{N-1} \sum_{m=lW}^{(l+1)W-1} \left\{ j\eta_n^{(2)} A_{n,m} h\left(t-mT-\frac{T}{2}\right) - (-1)^n \mu_n^{(2)} B_{n,m} h(t-mt) \right\} e^{jn\frac{2\pi}{T}} \quad (40)$$

In this case, the four candidate transmission signals $x_l^{(1)}(t)$, $x_l^{(2)}(t)$, $x_l^{(3)}(t)$, and $x_l^{(4)}(t)$ generated by the modulator 520 satisfy Equations 35, 36, 39, and 40, respectively.

Accordingly, in $x_l^{(3)}(t)$ and $x_l^{(4)}(t)$, a delayed channel is multiplied by the imaginary number j, as in $x_l^{(1)}(t)$ and $x_l^{(2)}(t)$, and even when the transmission signals for the respective consecutive data blocks are concatenated, the conditions according to Equation 6 and Equation 7 are satisfied.

In another example, when $x_l^{(1)}(t)$ and $x_l^{(2)}(t)$ are generated by setting the control bit $S_2$ of the switch 523 to 0, the modulator 520 may correct $x_l^{(1)}(t)$ and $x_l^{(2)}(t)$ as shown in the following Equations 41 and 42, respectively, by multiplying an imaginary number j.

$$x_l^{(1)}(t) = \sum_{n=0}^{N-1} \sum_{m=lW}^{(l+1)W-1} \left\{ j\eta_n^{(1)} A_{n,m} h(t-mT) - (-1)^n \mu_n^{(1)} B_{n,m} h\left(t-mt-\frac{T}{2}\right) \right\} e^{jn\frac{2\pi}{T}} \quad (41)$$

$$x_l^{(2)}(t) = \sum_{n=0}^{N-1} \sum_{m=lW}^{(l+1)W-1} \left\{ j\eta_n^{(2)} A_{n,m} h(t-mT) - (-1)^n \mu_n^{(2)} B_{n,m} h\left(t-mt-\frac{T}{2}\right) \right\} e^{jn\frac{2\pi}{T}} \quad (42)$$

In this case, the four candidate transmission signals $x_l^{(1)}(t)$, $x_l^{(2)}(t)$, $x_l^{(3)}(t)$, and $x_l^{(4)}(t)$ generated by the modulator 520 satisfy Equations 37, 38, 41, and 42, respectively, and even when the transmission signals for the respective consecutive data blocks are connected, the conditions according to Equation 6 and Equation 7 are satisfied.

The selector 530 selects a candidate transmission signal having the smallest peak power or the smallest PAPR from four candidate transmission signals generated for an $l^{th}$ data block as a transmission signal for the $l^{th}$ data block.

For example, the selector 530 may obtain a peak power of each of the candidate transmission signals $x_l^{(1)}(t)$, $x_l^{(2)}(t)$, $x_l^{(3)}(t)$ and $x_l^{(4)}(t)$, and select a candidate transmission signal having the lowest peak power as the transmission signal for the $l^{th}$ data block.

In this case, if currently generated candidate transmission signals are signals for the first data block of the data frame (i.e., l=0), a peak power of each of the candidate transmission signals may be obtained using Equation 43 below.

$$P_v = \max_t |x_0^{(v)}(t)|^2 \quad (43)$$

Here, v=1, 2, 3, 4 is satisfied.

On the other hand, if currently generated candidate transmission signals are candidate transmission signals for the second or subsequent data block of the data frame (i.e., l≥1), the selector 530 may obtain a peak power of each of the candidate transmission signals using Equation 44 below.

$$P_v = \max_{t \in R} |x'(t) + x_l^{(v)}(t)|^2 \quad (44)$$

Here, x'(t) denotes a signal generated by concatenating the transmission signals selected for each of the preceding data blocks.

Since a portion of x'(t) that does not overlap with $x_l^{(v)}(t)$ is not affected by $x_l^{(v)}(t)$, a time interval R may be set to a time domain occupied by $x_l^{(v)}(t)$, not the entire time interval of $x'(t)+x_l^{(v)}(t)$.

That is, considering pulse shaping of the first and the last symbols at $x_l^{(v)}(t)$, R may be set as shown below.

$$R = \left[ lWT - \frac{KT}{2}, (l+1)WT + \frac{T}{2} + \frac{KT}{2} \right] \quad (45)$$

Here, K denotes an overlap coefficient of a prototype filter h(t), and KT denotes a pulse length of h(t).

Meanwhile, the selector 530 concatenates the transmission signals for each of the data blocks in order and generates a transmission signal for one entire data frame.

According to one exemplary embodiment of the present disclosure, the selector 530 may multiply an arbitrary complex constant to the four candidate transmission signals generated for the $l^{th}$ data block by the modulator 520 and select a candidate transmission signal having the smallest peak power or the smallest PAPR as a transmission signal for the $l^{th}$ data block.

Meanwhile, in the example shown in FIG. 10, phase shift coefficients are set to $\eta_n^{(1)}$ and $\mu_n^{(1)}$, but are not necessarily limited thereto, and may be set to $\eta_n^{(2)}$ and $\mu_n^{(2)}$.

Figure 11:
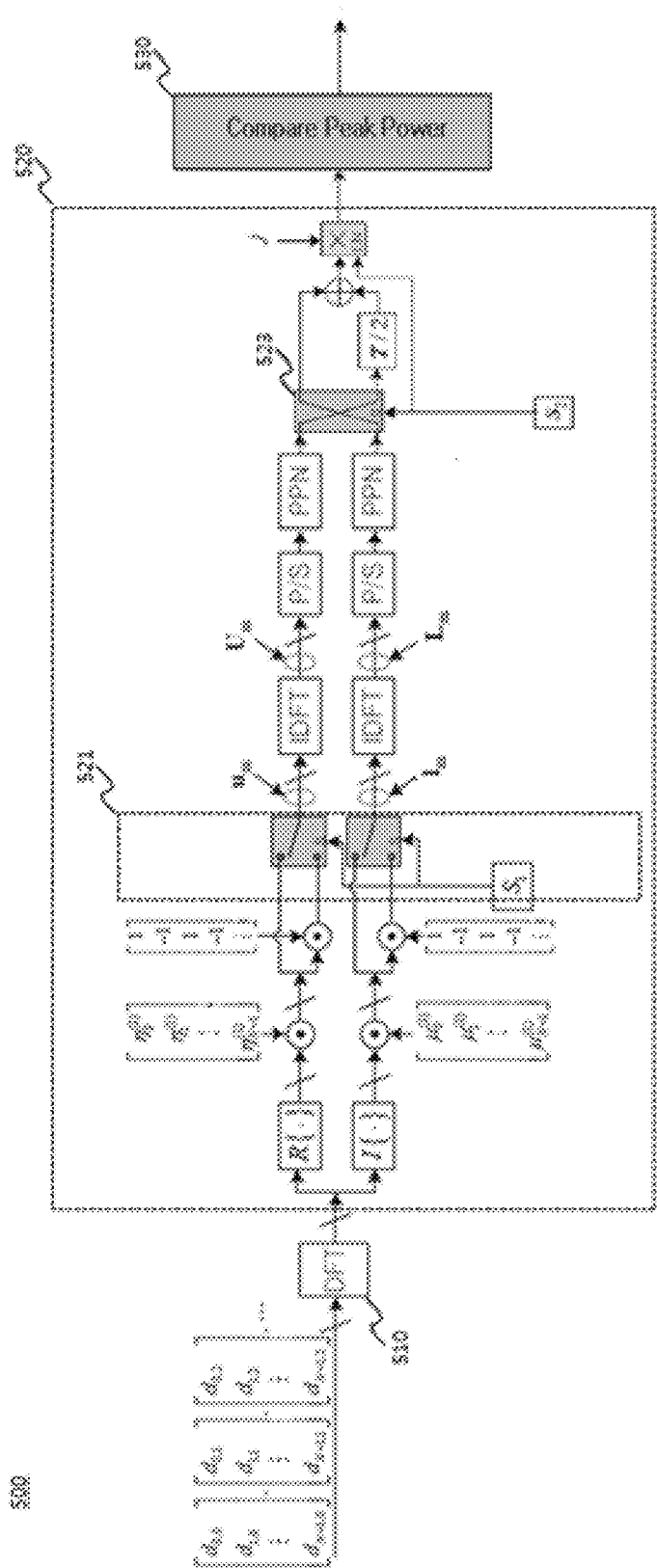
FIG. 11 is a diagram illustrating in detail a modulation apparatus according to a sixth exemplary embodiment of the present disclosure.

FIG. 11 is a diagram illustrating in detail a modulation apparatus according to a sixth exemplary embodiment of the present disclosure.

In the exemplary embodiment shown in FIG. 11, a DFT performer 510 and a selector 530 are substantially the same as those illustrated in FIG. 10, and thus redundant descriptions thereof will be omitted.

In the exemplary embodiment shown in FIG. 11, the modulation apparatus 500 divides one data frame into a plurality of consecutive data blocks, generates four candidate transmission signals for each of the data blocks, and selects a candidate transmission signal having the lowest peak power or the lowest PAPR from the four candidate transmission signals for each of the data blocks as a transmission signal for the corresponding data block, in the same manner as in the exemplary embodiment shown in FIG. 10. Then, the modulation apparatus 500 concatenates the transmission signals for each of the data blocks in order and generates a transmission signal for one entire data frame.

More specifically, the modulator 520 receives data symbols of an $l^{th}$ data block spread by the DFT performer 510 and generates four candidate transmission signals $x_l^{(1)}(t)$, $x_l^{(2)}(t)$, $x_l^{(3)}(t)$, and $x_l^{(4)}(t)$ for the $l^{th}$ data block.

In this case, the four candidate transmission signals $x_l^{(1)}(t)$, $x_l^{(2)}(t)$, $x_l^{(3)}(t)$, and $x_l^{(4)}(t)$ for the $l^{th}$ data block are the same as those generated in the example shown in FIG. 10.

More specifically, the modulator 520 controls a control bit $S_1$ of a switch 521 and a control bit $S_2$ of a switch 523 as shown below and multiplies an imaginary number j to a candidate transmission signal generated by setting the control bit $S_2$ of the switch 523 to 1, thereby generating four candidate transmission signals that satisfy Equations 35, 36, 39, and 40, respectively. Alternatively, the modulator 520 multiplies an imaginary number j to a candidate transmission signal generated by setting the control bit $S_2$ of the switch 523 to 0, thereby generating four candidate transmission signals that satisfy Equations 37, 38, 41, and 42, respectively.

| Candidate transmission signal | $S_1$ | $S_2$ |
| --- | --- | --- |
| $x_l^{(1)}(t)$ | 0 | 0 |
| $x_l^{(2)}(t)$ | 1 | 0 |
| $x_l^{(3)}(t)$ | 1 | 1 |
| $x_l^{(4)}(t)$ | 0 | 1 |

Meanwhile, in the example illustrated in FIG. 11, the phase shift coefficients are set to $\eta_n^{(1)}$ and $\mu_n^{(1)}$, but they are not limited thereto. The phase shift coefficients may be set to $\eta_n^{(2)}$ and $\mu_n^{(2)}$.

The configuration of the modulator 520 shown in FIGS. 6 to 11 is merely illustrative, and thus the configuration of the modulator 520 according to the present disclosure is not limited to the examples shown in FIGS. 6 to 11. Specifically, in addition to the examples shown in FIGS. 6 to 11, the configuration of the modulator 520 may be modified into various forms that can generate the candidate transmission signals as shown in FIGS. 6 to 11 or candidate transmission signals that are mathematically equivalent to signals generated by multiplying the candidate transmission signals of FIGS. 6 to 11 by the same constant. The present disclosure should be construed to include all such modifications.

According to the exemplary embodiments of the present disclosure, after a plurality of candidate transmission signals which are modulated according to a DFT-spread FBMC/OQAM scheme and are capable of achieving a single carrier effect are generated, a candidate transmission signal having the smallest PAPR is selected and transmitted, so that it is possible to effectively improve a PAPR performance.

Further, by adding a switching operation to an implementation structure of a conventional DFT-spread FBMC/OQAM scheme, it is possible to generate a plurality of candidate transmission signals which can achieve a single carrier effect with only one IDFT operation. Therefore, a PAPR performance can be improved without increasing computational load and structural complexity.

The current embodiments can be implemented as computer readable codes in a computer readable record medium. Codes and code segments constituting the computer program can be easily inferred by a skilled computer programmer in the art. The computer readable record medium includes all types of record media in which computer readable data are stored. Examples of the computer readable record medium include a ROM, a RAM, a CD-ROM, a magnetic tape, a floppy disk, and an optical data storage. Further, the record medium may be implemented in the form of a carrier wave such as Internet transmission. In addition, the computer readable record medium may be distributed to computer systems over a network, in which computer readable codes may be stored and executed in a distributed manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A modulation apparatus comprising:
a discrete Fourier transform (DFT) performer configured to generate DFT-spread data symbols by performing DFT on parallel input data symbols;
a modulator configured to divide the DFT-spread data symbols into real part symbols and imaginary part symbols, multiply each of the divided symbols by a phase shift coefficient, and modulate the multiplied symbols using a filter-bank multi-carrier (FBMC)/offset quadrature amplitude modulation (OQAM) scheme, thereby generating a plurality of different candidate transmission signals each of which is composed of identically time-shifted subcarriers; and
a selector configured to select a candidate transmission signal having the smallest peak power or the smallest peak to average power ratio (PAPR) from the plurality of candidate transmission signals as a transmission signal,
wherein the phase shift coefficient satisfies Equation 1 or Equation 2 below:

$$\eta_n = \chi j^n, \mu_n = \chi j(-j)^n \qquad (1)$$

$$\eta_n = \chi(-j)^n, \mu_n = \chi j^{n+1} \qquad (2)$$

where $\eta_n$ denotes a phase shift coefficient to be multiplied to a real part symbol transmitted by an $n^{th}$ subcarrier, $\mu_n$ denotes a phase shift coefficient to be multiplied to an imaginary part symbol transmitted by an $n^{th}$ subcarrier, n denotes a real number satisfying $0 \leq n < N-1$, N denotes the number of subcarriers allocated, and x denotes a complex number on a unit circle, i.e., $|\chi|=1$.

2. The modulation apparatus of claim 1, wherein the selector multiplies the plurality of candidate transmission signals by an arbitrary complex constant and selects a candidate transmission signal having the smallest peak power or the smallest PAPR from the plurality of candidate transmission signals multiplied by the complex constant.

3. The modulation apparatus of claim 1, wherein the modulator generates the candidate transmission signals by performing: a first modulation process in which inverse discrete Fourier transform (IDFT) is performed on the real part symbols multiplied by the phase shift coefficient and then filtering is performed using a poly phase network; a second modulation process in which IDFT is performed on the imaginary part symbols multiplied by the phase shift coefficient and then filtering is performed using a poly phase network; and a third modulation process in which one of an output of the first modulation process and an output of the second modulation process is delayed by T/2, where T denotes a symbol duration of the data symbol, and the outputs are summed up,
wherein the modulator generates two candidate transmission signals through a first switching operation for an IDFT output of the first modulation process and an IDFT output of the second modulation process.

4. The modulation apparatus of claim 3, wherein the first switching operation switches a $0^{th}$ to an $(N/2-1)^{th}$ outputs and an $(N/2)^{th}$ to an $(N-1)^{th}$ outputs for each of the IDFT output of the first modulation process and the IDFT output of the second modulation process.

5. The modulation apparatus of claim 1, wherein the modulator generates the candidate transmission signals by performing: a first modulation process in which IDFT is performed on the real part symbols multiplied by the phase shift coefficient or real part symbols obtained by inversing signs of odd index symbols after multiplying the phase shift coefficient and then filtering is performed using a poly phase network; a second modulation process in which IDFT is performed on the imaginary part symbols multiplied by the phase shift coefficient or imaginary part symbols obtained by inversing signs of odd index symbols after multiplying the phase shift coefficient and then filtering is performed using a poly phase network; and a third modulation process in which one of an output of the first modulation process and an output of the second modulation process is delayed by T/2, where T denotes a symbol duration of the data symbol, and the outputs are summed up, wherein the modulator generates two candidate transmission signals through a first switching operation for selecting the real part symbols multiplied by the phase shift coefficient and the imaginary part symbols multiplied by the phase shift coefficient as an IDFT input of the first modulation process and an IDFT input of the second modulation process, respectively, or selecting the real part symbols with the sign-inversed odd index symbols and the imaginary part symbols with the sign-inversed odd index symbols as the IDFT input of the first modulation process and the IDFT input of the second modulation process, respectively.

6. The modulation apparatus of claim 3, wherein the modulator generates four candidate transmission signals through the first switching operation and a second switching operation for selecting an output to be delayed by T/2 from the output of the first modulation process and the output of the second modulation process.

7. The modulation apparatus of claim 6, wherein the parallel input data symbols are data symbols of an $l^{th}$ data block, where l is a real number satisfying 0≤l≤L−1 and L is the number of data blocks, among a plurality of consecutive data blocks divided from one data frame and the four candidate transmission signals are candidate transmission signals for the $l^{th}$ data block.

8. The modulation apparatus of claim 7, wherein the modulator multiplies an imaginary number j to two candidate transmission signals generated by the same operation status among the four candidate transmission signals on the basis of an operation status of the second switching operation.

9. The modulation apparatus of claim 8, wherein the selector generates a transmission signal for the entire data frame by concatenating a candidate transmission signal selected from the four candidate transmission signals for the $l^{th}$ data block and transmission signals for each of a $0^{th}$ data block to an (l−1)th data block.

10. A modulation method comprising operations of:
(a) generating discrete Fourier transform (DFT)-spread data symbols by performing DFT on parallel input data symbols;
(b) dividing the DFT-spread data symbols into real part symbols and imaginary part symbols, multiplying each of the divided symbols by a phase shift coefficient, modulating the multiplied symbols using a filter-bank multi-carrier (FBMC)/offset quadrature amplitude modulation (OQAM) scheme, thereby generating a plurality of different candidate transmission signals each of which is composed of identically time-shifted subcarriers; and
(c) selecting a candidate transmission signal having the smallest peak power or the smallest peak to average power ratio (PAPR) from the plurality of candidate transmission signals as a transmission signal,
wherein the phase shift coefficient satisfies Equation 1 or Equation 2 below:

$$\eta_n = \chi j^n, \mu_n = \chi j(-j)^n \quad (1)$$

$$\eta_n = \chi(-j)^n, \mu_n = \chi j^{n+1} \quad (2)$$

where $\eta_n$ denotes a phase shift coefficient to be multiplied to a real part symbol transmitted by an $n^{th}$ subcarrier, $\mu_n$ denotes a phase shift coefficient to be multiplied to an imaginary part symbol transmitted by an $n^{th}$ subcarrier, n denotes a real number satisfying 0≤n<N−1, N denotes the number of subcarriers allocated, and x denotes a complex number on a unit circle, i.e., $|\chi|=1$.

11. The modulation method of claim 10, wherein the operation (c) includes multiplying the plurality of candidate transmission signals by an arbitrary complex constant and selecting a candidate transmission signal having the smallest peak power or the smallest PAPR from the plurality of candidate transmission signals multiplied by the complex constant.

12. The modulation method of claim 10, wherein the operation (b) includes performing: a first modulation process in which inverse discrete Fourier transform (IDFT) is performed on the real part symbols multiplied by the phase shift coefficient and then filtering is performed using a poly phase network; a second modulation process in which IDFT is performed on the imaginary part symbols multiplied by the phase shift coefficient and then filtering is performed using a poly phase network; and a third modulation process in which one of an output of the first modulation process and an output of the second modulation process is delayed by T/2, where T denotes a symbol duration of the data symbol, and the outputs are summed up,
wherein two candidate transmission signals are generated through a first switching operation for an IDFT output of the first modulation process and an IDFT output of the second modulation process.

13. The modulation method of claim 12, wherein the first switching operation switches a $0^{th}$ to an $(N/2-1)^{th}$ outputs and an $(N/2)^{th}$ to an $(N-1)^{th}$ outputs for each of the IDFT output of the first modulation process and the IDFT output of the second modulation process.

14. The modulation method of claim 10, wherein the operation (b) includes performing: a first modulation process in which IDFT is performed on the real part symbols multiplied by the phase shift coefficient or real part symbols obtained by inversing signs of odd index symbols after multiplying the phase shift coefficient and then filtering is performed using a poly phase network; a second modulation process in which IDFT is performed on the imaginary part symbols multiplied by the phase shift coefficient or imaginary part symbols obtained by inversing signs of odd index symbols after multiplying the phase shift coefficient and then filtering is performed using a poly phase network; and a third modulation process in which one of an output of the first modulation process and an output of the second modulation process is delayed by T/2, where T denotes a symbol duration of the data symbol, and the outputs are summed up,
wherein two candidate transmission signals are generated through a first switching operation for selecting the real part symbols multiplied by the phase shift coefficient and the imaginary part symbols multiplied by the phase shift coefficient as an IDFT input of the first modulation process and an IDFT input of the second modulation process, respectively, or selecting the real part symbols with the sign-inversed odd index symbols and the imaginary part symbols with the sign-inversed odd index symbols as the IDFT input of the first modulation process and the IDFT input of the second modulation process, respectively.

15. The modulation method of claim 12, wherein the operation (b) includes generating four candidate transmission signals through the first switching operation and a second switching operation for selecting an output to be delayed by T/2 from the output of the first modulation process and the output of the second modulation process.

16. The modulation method of claim 15, wherein the parallel input data symbols are data symbols of an $l^{th}$ data block, where l is a real number satisfying 0≤l≤L−1 and L is the number of data blocks, among a plurality of consecutive data blocks divided from one data frame and the four candidate transmission signals are candidate transmission signals for the $l^{th}$ data block.

17. The modulation method of claim 16, wherein the operation (b) includes multiplying an imaginary number j to two candidate transmission signals generated by the same operation status among the four candidate transmission signals on the basis of an operation status of the second switching operation.

18. The modulation method of claim 17, further comprising:
  repeatedly performing the operations (a) to (c) for each of an $(l+1)^{th}$ data block to an $(L-1)^{th}$ data block; and
  generating a transmission signal for the entire data frame by concatenating transmission signals of each of a $0^{th}$ data block to an $(L-1)^{th}$ data block.

* * * * *